(12) United States Patent
Suzuki

(10) Patent No.: US 9,631,937 B2
(45) Date of Patent: Apr. 25, 2017

(54) INFORMATION PROCESSING APPARATUS, ROUTE NAVIGATOR, INFORMATION PROCESSING METHOD, AND COMPUTER PROGRAM STORAGE MEDIUM

(71) Applicant: SONY CORPORATION, Tokyo (JP)

(72) Inventor: Toshikazu Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/796,481

(22) Filed: Jul. 10, 2015

(65) Prior Publication Data

US 2016/0003633 A1 Jan. 7, 2016

Related U.S. Application Data

(63) Continuation of application No. 14/004,303, filed as application No. PCT/JP2012/001751 on Mar. 14, 2012, now Pat. No. 9,109,899.

(30) Foreign Application Priority Data

Mar. 22, 2011 (JP) .................. 2011-062730

(51) Int. Cl.
*G01C 21/34* (2006.01)
*G01C 21/00* (2006.01)

(52) U.S. Cl.
CPC ............. *G01C 21/34* (2013.01); *G01C 21/00* (2013.01); *G01C 21/3484* (2013.01)

(58) Field of Classification Search
CPC ................................ G01C 21/00; G01C 21/34
USPC ................................................ 701/527, 533
See application file for complete search history.

(56) References Cited

U.S. PATENT DOCUMENTS

| 5,031,104 A * | 7/1991 | Ikeda ................. | G01C 21/3682 340/990 |
| 2005/0192742 A1* | 9/2005 | Okochi .............. | G01C 21/3484 701/424 |
| 2006/0259235 A1* | 11/2006 | Yamakage ......... | G01C 21/3614 701/431 |
| 2006/0265122 A1 | 11/2006 | Chang et al. | |
| 2009/0299620 A1* | 12/2009 | Shin ................... | G01C 21/3484 701/532 |
| 2011/0077850 A1* | 3/2011 | Ushida ............... | G01C 21/3664 701/532 |

(Continued)

FOREIGN PATENT DOCUMENTS

| JP | 08-094371 A | 4/1996 |
| JP | 2000-74682 A | 3/2000 |
| JP | 2003-240592 A | 8/2003 |

(Continued)

OTHER PUBLICATIONS

Office action received for Japanese Patent Application No. 2015-114523, mailed on Mar. 1, 2016, 5 pages.

*Primary Examiner* — Tan Q Nguyen
(74) *Attorney, Agent, or Firm* — Chip Law Group

(57) ABSTRACT

An information processing apparatus may be implemented as a route navigator, which uses a route navigation method and a computer program product. A processing circuit is used to calculate respective passage frequencies of passageway segments in a passage history. The processing circuit then selects a navigation route to a destination, includes at least one passageway segment with a passage frequency that is a low or zero passage frequency.

15 Claims, 22 Drawing Sheets

(56) References Cited

U.S. PATENT DOCUMENTS

2012/0101728 A1* 4/2012 Kudo .................. G01C 21/3461
                                                           701/540

FOREIGN PATENT DOCUMENTS

| JP | 2006-47147 A | 2/2006 |
| JP | 2006-275934 A | 10/2006 |
| JP | 2008-292237 A | 12/2008 |
| JP | 2009-264944 A | 11/2009 |

* cited by examiner

INFORMATION PROCESSING APPARATUS, ROUTE NAVIGATOR, INFORMATION PROCESSING METHOD, AND COMPUTER PROGRAM STORAGE MEDIUM

CROSS-REFERENCE TO RELATED APPLICATION

The present application is a continuation of U.S. patent application Ser. No. 14/004,303 filed on Sep. 20, 2013 which is a U.S. National Phase Entry Application of the International Patent Application No. PCT/JP12/01751 filed on Mar. 14, 2012 based on Japanese Patent Appl. No. 2011-062730 filed in the Japanese Patent Office on Mar. 22, 2011 in the Japanese Patent Office, the entire content of which is incorporated herein by reference.

TECHNICAL FIELD

The present technology relates to an information processing apparatus, route navigator, an information processing method, and a computer program product and particularly relates to an information processing apparatus, route navigator, method and computer program product with which it is possible to search for a route where a passage frequency is low.

BACKGROUND ART

In recent years, vehicle installment-type or portable-type navigation terminals have been widely used. Among mobile phone devices and so-called smart phones too, one having a positioning function that can be used as the navigation terminal exists.

CITATION LIST

Patent Literature

PTL 1: Japanese Unexamined Patent Application Publication No. 2005-31071

SUMMARY OF INVENTION

Technical Problem

For a situation where the navigation terminal is used, the navigation terminal is often used for a route search from a fixed location to a fixed destination, for instance, from home to a company, or from the company to home. Therefore, if the same navigation terminal is regularly used, a similar route is regularly searched, and a guidance of the same route is eventually given.

The present technology has been made in view of the above-mentioned circumstances and aims at searching for a route where a passage frequency is low.

Solution to Problem

In one embodiment, an information processing apparatus includes a processing circuit that
calculates respective passage frequencies of passageway segments in a passage history, and
selects a navigation route to a destination, includes at least one passageway segment with a passage frequency that is a low or zero passage frequency.

One aspect of this embodiment is that it may also include a wireless interface configured to send a search query to a remote device and receive data describing the navigation route that includes the passageway segment.

According to another aspect, the passageway segment is a road.

According to another aspect, the passageway segment is at least one of a pedestrian path and a sidewalk.

According to another aspect, the passageway segment is a bicycle path.

According to another aspect, the processing circuit sets a predetermined area that includes a current position and a destination, and selects the navigation route to be within the predetermined area.

According to another aspect, a size of the predetermined area is expanded to in accordance with a user-specified extra-time input.

According to another aspect, the processing circuit selects the navigation route to coincide with a user-selectable location of interest.

According to another aspect, the processing circuit selects the navigation route to coincide with a location of interest, the location of interest is selected from website provided information.

According to another aspect the apparatus may include
a movement mode detection unit that detects one of a plurality of user movement modes; and
a storage device that stores the passage history for each of the plurality of user movement modes, wherein
the processing circuit calculates the passage frequency based on the passage history for respective of the plurality of user movement modes.

According to another embodiment, route navigator, includes
a search unit configured to selectably perform navigation searches in a first mode and a second mode,
when operating in the first mode, the search unit identifies a navigation route that includes a passageway segment that is not included in another navigation route identified with the second mode and has a passage frequency that is below a predetermined threshold,
when operating in the second mode, the search unit identifies the another navigation route according to a priority of at least one of a shortest distance and a shortest travel time; and
a display control circuit that displays the navigation route when the search unit is operating in the first mode.

According to one aspect of this embodiment, the route navigator may further include a wireless interface configured that sends a search query to a remote device, and receive data describing the navigation route that includes the passageway segment.

According to another aspect, the passageway segment is a road.

According to another aspect, the passageway segment is at least one of a pedestrian path and a sidewalk.

According to another aspect, the passageway segment is a bicycle path.

According to another aspect, the passage history is zero.

According to another aspect, the search unit sets a predetermined area that includes a current position and a destination, and selects the navigation route to be within the predetermined area.

According to another aspect, when operating in the first mode, a size of the predetermined area is expanded to in accordance with a user-specified extra-time input.

According to another aspect, the search unit selects the navigation route to coincide with a user-selectable location of interest.

According to another aspect, the search selects the navigation route to coincide with a location of interest, the location of interest is selected from website provided information.

According to another aspect the route navigator may further include a movement mode detection unit that detects one of a plurality of user movement modes; and a storage device that stores the passage history for each of the plurality of user movement modes, wherein the search unit calculates the passage frequency based on the passage history for respective of the plurality of user movement modes.

According to a method embodiment, the method includes calculating with a processing circuit respective passage frequencies of passageway segments in a passage history, and selecting a navigation route to a destination, includes at least one passageway segment with a passage frequency that is a low or zero passage frequency.

According to one aspect of the method, the method may also include selectably performing with a search unit navigation searches in a first mode and a second mode, when operating in the first mode, identifying a navigation route that includes a passageway segment that is not included in another navigation route identified with the second mode and has a passage frequency that is below a predetermined threshold, when operating in the second mode, the identifying the another navigation route according to a priority of at least one of a shortest distance and a shortest travel time; and displaying with a display control circuit the navigation route when the search unit is operating in the first mode.

According to a non-transitory computer storage medium embodiment, the storage medium has instructions stored therein that when executed by a processing circuit perform an information processing method, the method comprising:

calculating with the processing circuit respective passage frequencies of passageway segments in a passage history, and selecting a navigation route to a destination, includes at least one passageway segment with a passage frequency that is a low or zero passage frequency.

Advantageous Effects of Invention

According to the present technology, it is possible to search for the route where the passage frequency is low.

DESCRIPTION OF EMBODIMENTS

Hereinafter, embodiments for implementing the present technology will be described. The description will be given in the following order.

1. First Embodiment (an example in which a route search is carried out on an information processing terminal side)

2. Second Embodiment (an example in which a route search is carried out on a server side)

First Embodiment

Configuration of Information Processing Terminal

Figure 1:
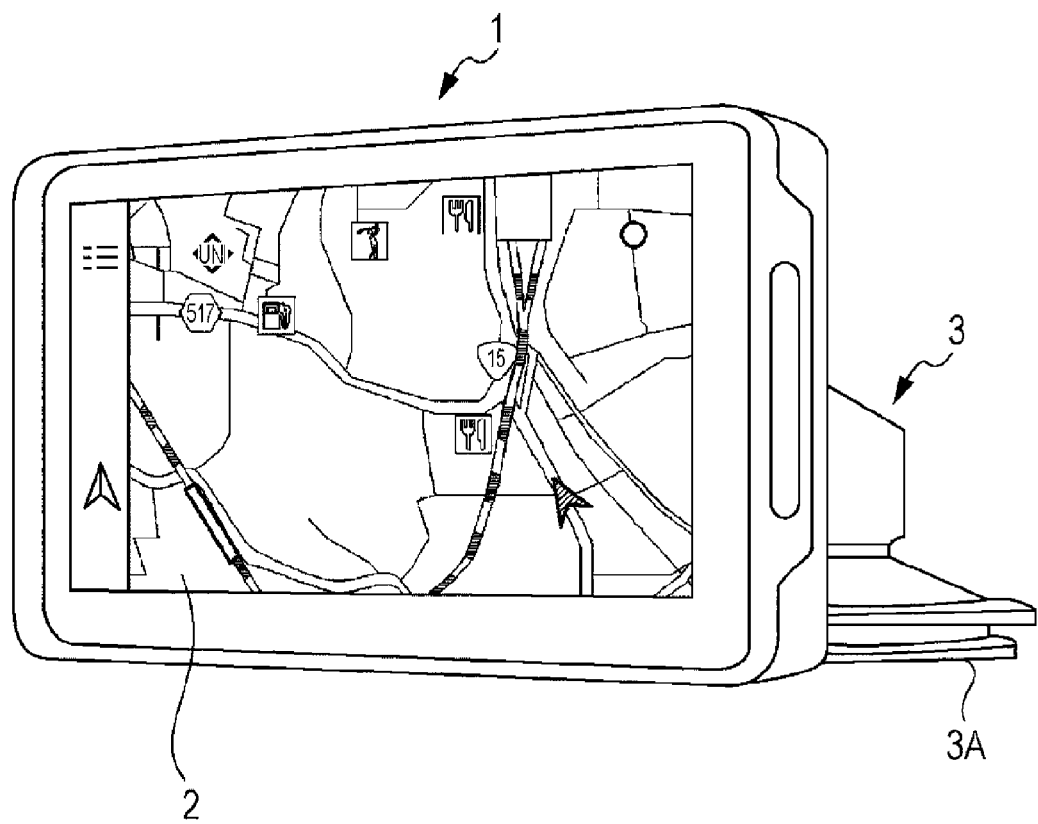
FIG. 1 illustrates an external appearance configuration example of an information processing terminal according to an embodiment of the present technology.

FIG. 1 illustrates an external appearance configuration example of an information processing terminal according to an embodiment of the present technology.

An information processing terminal 1 of FIG. 1 is a PND (Portable Navigation Device) and has a casing with a size at which a user can hold by one hand. A display unit 2 composed of LCD (Liquid Crystal Display) or the like is provided on a front face of the casing of the information processing terminal 1. For example, a touch panel is layered and provided on the display unit 2, and a button or the like displayed on the display unit 2 can be directly operated by the user with a finger.

The information processing terminal 1 has a GPS (Global Positioning System) function and performs a positioning of its own terminal to display a position of its own terminal on a map displayed on the display unit 2. Also, in a case where a destination is set and a search for a route (path) to the destination is instructed, the information processing terminal 1 performs the search and displays the route decided by the search on the map.

A member with which the information processing terminal 1 can be fixed to a cradle 3 is provided on a back face of the casing of the information processing terminal 1. The user can attach the information processing terminal 1, for example, to the cradle 3 that is fixed to a dashboard of an automobile by a suction disc 3A and detach the information processing terminal 1 from the cradle 3 to bring out.

For the cradle of the information processing terminal 1, in addition to the cradle 3 which is an automobile-use cradle, a plurality of cradles such as a bicycle-use cradle are prepared. When attached to the cradle, for example, the information processing terminal 1 is electrically connected to the cradle and detects to which cradle the information processing terminal is attached on the basis of an ID or the like read out from the cradle. For use cases of the information processing terminal 1, the user may take along the information processing terminal 1 and move on foot and attach the information processing terminal 1 to the bicycle-use cradle and move by bicycle. Also, the user may attach the information processing terminal 1 to the automobile-use cradle and move by automobile.

Hereinafter, mainly, the case will be described in which a movement mode of the user is on foot, by bicycle, or by automobile, but the mode in which the user brings about the information processing terminal 1 and moves is not limited to the movement on foot, the movement by bicycle, or the movement by automobile.

The information processing terminal 1 having the above-mentioned external appearance configuration accumulates and manages histories of passageways, such as sidewalks, pedestrian walking/running paths, bicycle trails or roads, passed by the user on foot, by bicycle, or by automobile for each movement mode. A memory inside the information processing terminal 1 respectively stores the history of the roads passed on foot, the history of the roads passed by bicycle, and the history of the roads passed by automobile.

When a search for a route from a current position to a destination is instructed, the information processing terminal 1 preferentially selects a road where a passage frequency is low on the basis of the passage history in accordance with the current movement mode of the user and decides the route to the destination. The road where the passage frequency is low includes not only a road where the number of passages is small but also a road which has not been passed. The route to the destination decided while the road where the passage frequency is low is preferentially selected is displayed on the display unit 2 to be presented to the user.

Figure 2:
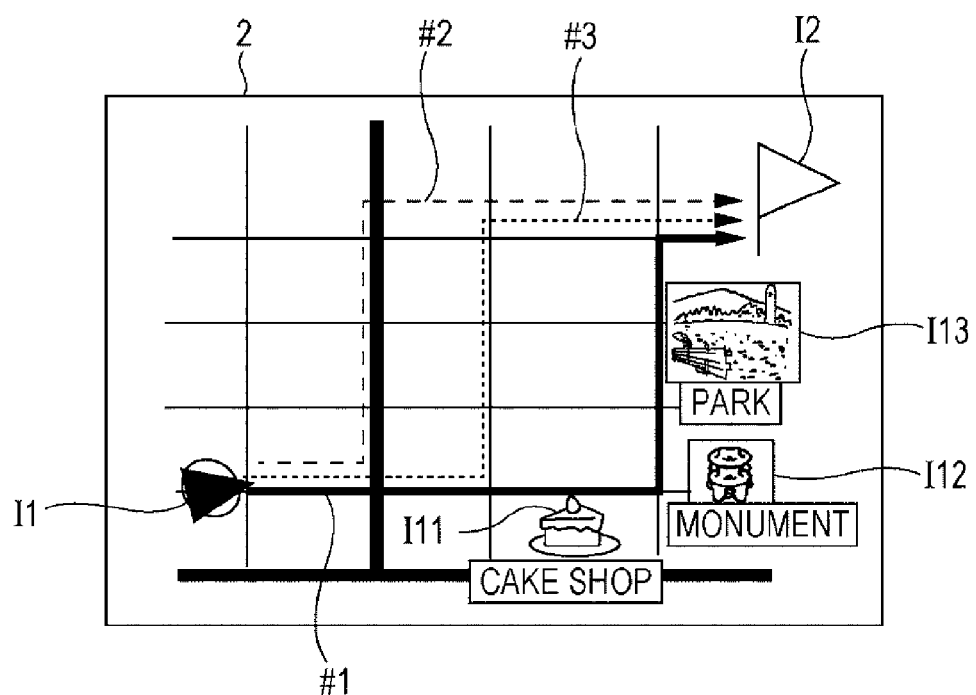
FIG. 2 illustrates a display example of a route of a search result.

FIG. 2 illustrates a display example of the route decided while the road where the passage frequency is low is preferentially selected.

In the example of FIG. 2, a map in a predetermined range is displayed on the display unit 2, and at a location corresponding to the current position of the information processing terminal 1, an icon I1 representing the current position of the information processing terminal 1 is displayed. Also, at a location corresponding to the destination set by the user, an icon I2 representing the destination is displayed.

Also, among routes connecting the current position with the destination, the route decided while the road where the passage frequency is low is preferentially selected is displayed by a solid line arrow #1. A route represented by a broken line arrow #2 is a route composed of a road with a high passage frequency, and a route represented by a broken line arrow #3 is a route with a shortest distance. It is also possible to set that he route composed of the road with the high passage frequency and the shortest distance route are not displayed on the display unit 2.

According to this, the user can check the road where the passage frequency is low, and while moving by following the displayed route, it is possible to go to the destination by using a road different from the usual road. By using the road different from the usual road, the user can encounter fresh discoveries along the road and be familiar with an area along the road.

It should be noted that icons I11, I12, and I13 illustrated along the route with the low passage frequency in FIG. 2 are icons respectively representing a location of a cake shop, a location of a monument, and a location of a park. These icons are displayed while the location of the cake shop, the location of the monument, and the location of the park are previously registered by the user. Also, for example, text data such as a posting to a bulletin board is obtained from a Web server, and these icons are displayed in accordance with an inclusion of information on the cake shop, the monument, and the park in the obtained text data.

That is, for the search for the route, appropriately, not only the passage frequency, but also the locations registered by the user, the locations posted to the bulletin board, and the like are taken into account. A route search taking into account these pieces of information will be described below.

Figure 3:
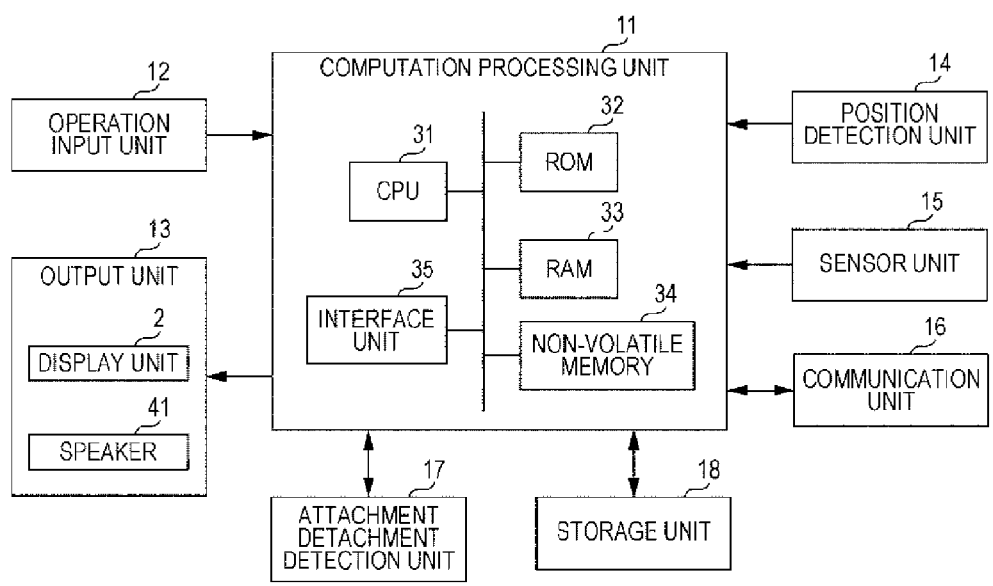
FIG. 3 is a block diagram illustrating a hardware configuration example of the information processing terminal.

FIG. 3 is a block diagram illustrating a hardware configuration example of the information processing terminal 1.

The information processing terminal 1 is composed by connecting an operation input unit 12, an output unit 13, a position detection unit 14, a sensor unit 15, a communication unit 16, an attachment detachment detection unit 17, and a storage unit 18 to a computation processing unit 11.

The computation processing unit 11 is composed by connecting a CPU (Central Processing Unit) 31, a ROM (Read Only Memory) 32, a RAM (Random Access Memory) 33, a non-volatile memory 34, and an interface unit 35 via a bus. The CPU 31 loads programs from the ROM 32 and the non-volatile memory 34 to be executed by using the RAM 33 to control an overall operation of the information processing terminal 1.

The non-volatile memory 34 is a memory that is rewritable and also can hold data even when a supply from a power source is interrupted. The non-volatile memory 34 is composed of an SRAM (Static Random Access Memory) where the power source is backed up by a battery, a flash memory, or the like.

The interface unit 35 functions as an interface between respective units connected to the computation processing unit 11. The control information with respect to the respective units from the CPU 31 and the information with respect to the CPU 31 from the respective units are transmitted and received via the interface unit 35.

The operation input unit 12 detects operations by the user with respect to a switch provided to the casing of the information processing terminal 1 and the touch panel layered on the display unit 2 and outputs the information representing the contents of the operations by the user to the computation processing unit 11. Also, the operation input unit 12 receives a signal from a remote controller and outputs the information representing the contents of the operations by the user with respect to the remote controller to the computation processing unit 11. An audio input with respect to a microphone or the like and an input of an image by a camera or the like may be detected by the operation input unit 12.

The output unit 13 is composed of the display unit 2 and a speaker 41. The display unit 2 displays the map and the route of the search result to be presented to the user while following the control by the computation processing unit 11.

In a case where the route of the search result is presented to the user instead of the image display, the speaker 41 outputs a sound for notifying of the route of the search result while following the control by the computation processing unit 11.

The position detection unit 14 receives radio waves from the GPS and detects the position of the information processing terminal 1. Instead of using the radio waves from the GPS, the positioning may be carried out by using radio waves from a base station of the mobile phone device, radio waves from an access point of a wireless LAN (Local Area Network), or the like.

The sensor unit 15 is composed of a sensor such as a gyro sensor, an acceleration sensor, or a vibration sensor. Information detected by the sensor unit 15 is output to the computation processing unit 11 and used for a correction on the location detected by the position detection unit 14 or the like.

The communication unit 16 performs a communication with an apparatus on a network such as a LAN or the internet via a radio transmission such as Bluetooth (trademark) or a wireless LAN. The information processing terminal 1 may be connected to an external apparatus via a fixed line such as a USB (Universal Serial Bus) cable.

The attachment detachment detection unit 17 detects a state of the attachment of the information processing terminal 1 with respect to the cradle. Also, the attachment detachment detection unit 17 detects to which cradle the attachment is made. Information on a detection result by the attachment detachment detection unit 17 is supplied to the computation processing unit 11.

The state of the attachment with respect to the cradle may be detected on the basis of a change in a power source voltage when connected to a terminal provided to a joining part with the cradle, or a switch may be provided to the joining part with the cradle and the attachment may be mechanically detected. Also, a handle for transport may be provided to the casing of the information processing terminal 1, and the state of the attachment may be detected on the basis of whether the handle is stored or not. For example, in a case where the handle is stored, the attachment to the cradle is detected. A type of the attached cradle is detected, for example, on the basis of the ID read out from the cradle when attached to the cradle as described above.

The storage unit 18 is composed of a flash memory, a hard disc, or the like and stores information on map data and the passage history. The storage unit 18 also stores POI (Point Of Interest) information which is information on a building, a shop, a park, and the like on the map, search information, music contents, video contents, and the like.

Figure 4:
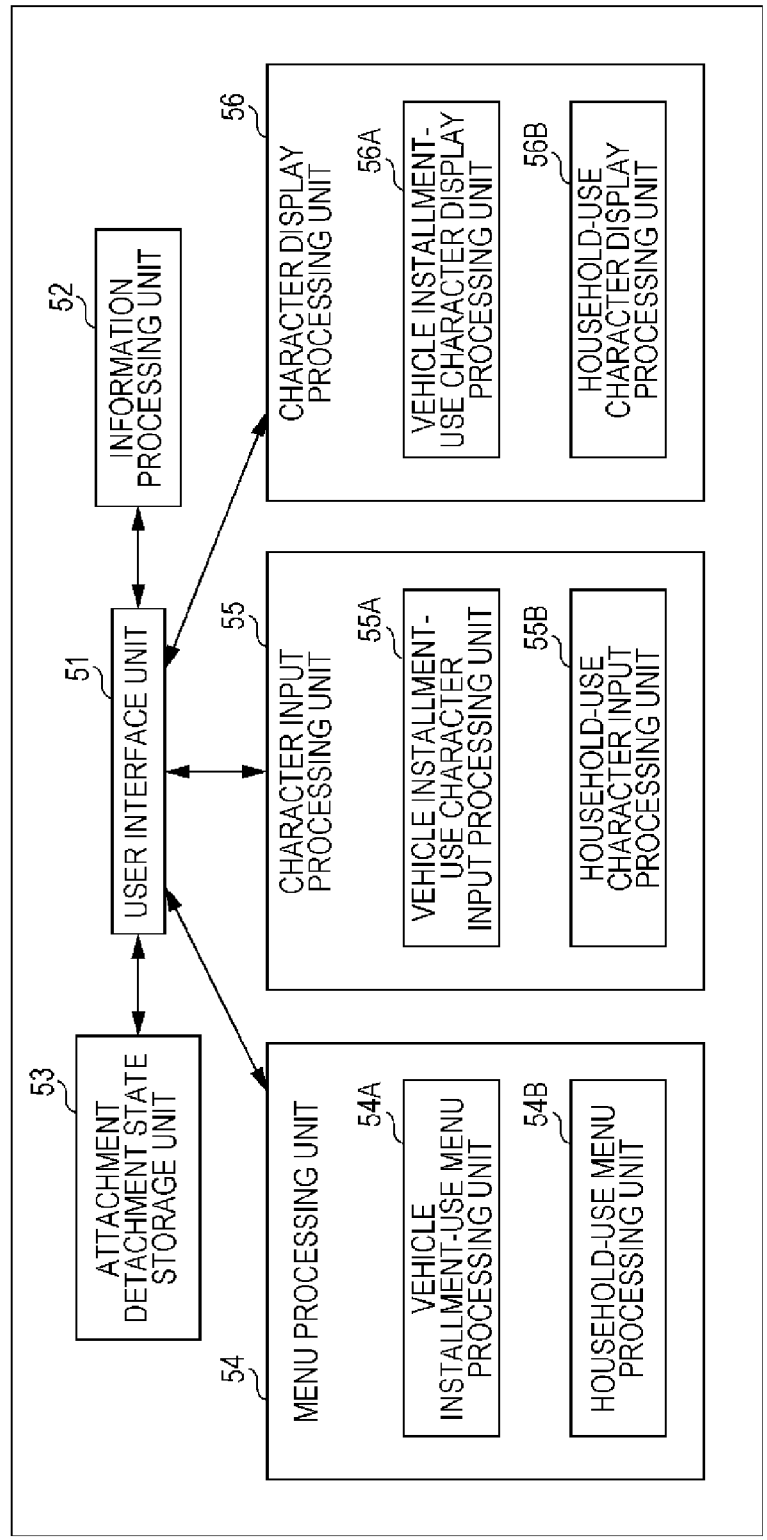
FIG. 4 is a block diagram illustrating a function configuration example of the information processing terminal.

FIG. 4 is a block diagram illustrating a function configuration example of the information processing terminal 1. At least a part of function units illustrated in FIG. 4 is realized while a predetermined program is executed by the CPU 31 of FIG. 3.

A user interface unit 51 obtains the information supplied from the operation input unit 12 to be output to an information processing unit 52. Also, the user interface unit 51 obtains the information supplied from the attachment detachment detection unit 17 to be output to the information processing unit 52 and also causes an attachment detachment state storage unit 53 to store information representing the attachment detachment state with respect to the cradle.

Furthermore, on the basis of the information supplied from the information processing unit 52, a menu processing unit 54, and a character display processing unit 56, the user interface unit 51 controls a display of the display unit 2. For example, information on the map and information on the route of the search result are supplied from the information processing unit 52. Also, information on a menu screen is supplied from the menu processing unit 54. Information on a character input by the user is supplied from the character display processing unit 56.

The menu processing unit 54 is composed of a vehicle installment-use menu processing unit 54A and a household-use menu processing unit 54B. When a display of a vehicle installment-use menu screen is instructed by the user in a case where the information processing terminal 1 is attached to the automobile-use cradle, the vehicle installment-use menu processing unit 54A outputs information on the vehicle installment-use menu screen to the user interface unit 51 to be displayed on the display unit 2. Whether the information processing terminal 1 is attached to the automobile-use cradle or not is identified on the basis of the information stored in the attachment detachment state storage unit 53.

When a display of a menu screen is instructed by the user in cases other than the case where the information processing terminal 1 is attached to the automobile-use cradle, the household-use menu processing unit 54B outputs information on the menu screen to the user interface unit 51 to be displayed on the display unit 2. Different menu screens are displayed, for example, in a case where the information processing terminal 1 is attached to the automobile-use cradle and in the other cases.

A character input processing unit 55 is composed of a vehicle installment-use character input processing unit 55A and a household-use character input processing unit 55B. When an input of a character is requested by the user in a case where the information processing terminal 1 is attached to the automobile-use cradle, the vehicle installment-use character input processing unit 55A causes the input of the character by displaying an input column for the character on the display unit 2 or the like. The input of the character by the user is carried out at the time of the search for the location or the like.

When the input of the character is requested by the user in cases other than the case where the information processing terminal 1 is attached to the automobile-use cradle, the household-use character input processing unit 55B causes the input of the character by displaying the input column for the character on the display unit 2 or the like. Different input columns for the character are displayed, for example, in a case where the information processing terminal 1 is attached to the automobile-use cradle or in other cases.

The character display processing unit 56 is composed of a vehicle installment-use character display processing unit 56A and a household-use character display processing unit 56B. When the character is input by the user in a case where the information processing terminal 1 is attached to the automobile-use cradle, the vehicle installment-use character display processing unit 56A outputs information on the character input by the user to the user interface unit 51 to be displayed on the display unit 2.

When the character is input by the user in cases other than the case where the information processing terminal 1 is attached to the automobile-use cradle, the household-use character display processing unit 56B outputs the information on the character input by the user to the user interface unit 51 to be displayed on the display unit 2.

Figure 5:
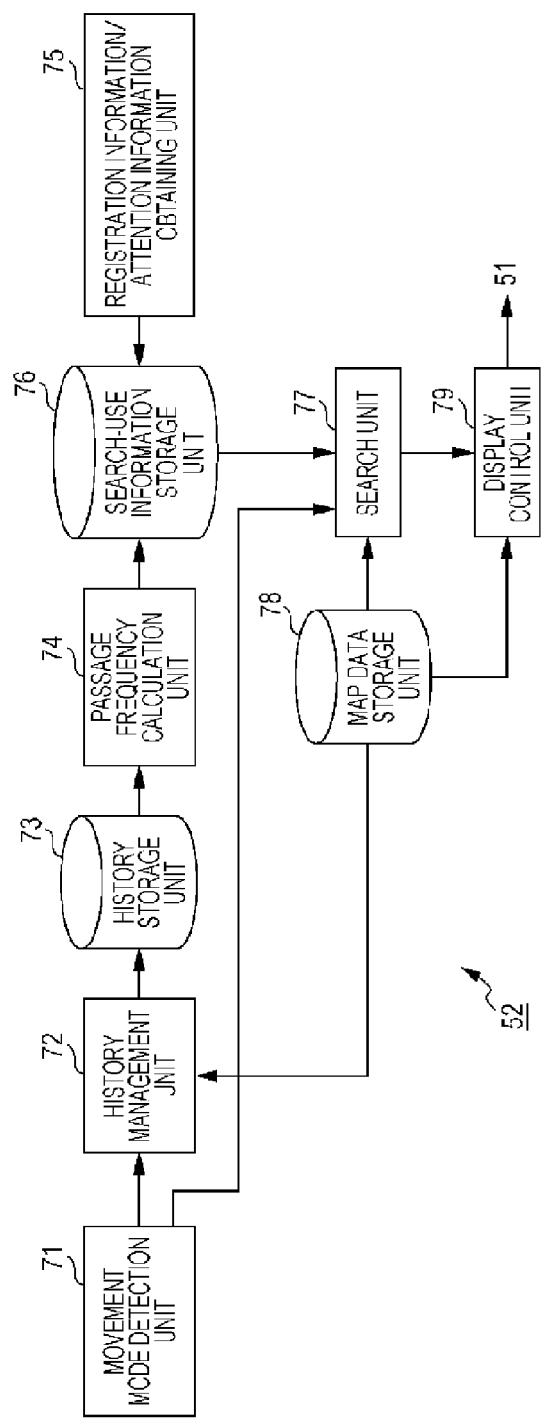
FIG. 5 is a block diagram illustrating a configuration example of an information processing unit of FIG. 4.

FIG. 5 is a block diagram illustrating a configuration example of the information processing unit 52 of FIG. 4.

The information processing unit 52 is composed of a movement mode detection unit 71, a history management unit 72, a history storage unit 73, a passage frequency calculation unit 74, a registration information/attention information obtaining unit 75, a search-use information storage unit 76, a search unit 77, a map data storage unit 78, and a display control unit 79. The history storage unit 73, the registration information/attention information obtaining unit 75, and the map data storage unit 78 are realized, for example, in the storage unit 18. The history storage unit 73, the registration information/attention information obtaining unit 75, and the map data storage unit 78 may also be realized in storage units other than the storage unit 18 such as a storage unit on the server and removable media mounted to the information processing terminal 1.

The information representing the attachment detachment state with respect to the cradle detected by the attachment detachment detection unit 17 is input from the user interface unit 51 to the movement mode detection unit 71. Also, the information on the current position obtained through the positioning by the position detection unit 14 is input from the user interface unit 51 to the history management unit 72 and the search unit 77. The information representing the content of the operation by the user detected by the operation input unit 12 is input from the user interface unit 51 to the registration information/attention information obtaining unit 75 and the search unit 77.

The movement mode detection unit 71 determines a movement mode of the user on the basis of the information representing the attachment detachment state with respect to the cradle detected by the attachment detachment detection unit 17. For example, in a case where the information processing terminal 1 is not attached to the cradle, the movement mode detection unit 71 determines that the movement mode of the user is on foot, and in a case where the information processing terminal 1 is attached to the bicycle-use cradle, it is determined that the movement mode of the user is by bicycle. Also, in a case where the information processing terminal 1 is attached to the automobile-use cradle, the movement mode detection unit 71 determines that the movement mode of the user is by car.

The movement mode detection unit 71 outputs the information representing the determined movement mode of the user to the history management unit 72 at the time of the accumulation of the passage history. Also, the movement mode detection unit 71 outputs the information representing the determined movement mode of the user to the search unit 77 at the time of the search for the route.

The history management unit 72 obtains the information representing the movement mode of the user supplied from the movement mode detection unit 71 and the information on the current position detected by the position detection unit 14 in a predetermined cycle when the user moves while carrying about the information processing terminal 1. The history management unit 72 performs a matching with the map data stored in the map data storage unit 78 or the like to detect a road through which the user is currently passing and stores information on the passed road in the history storage unit 73 as a passage history for each movement mode of the user. The information on the passed road which is stored as the passage history includes not only identification information as to which road is passed but also information on a gradient of the road.

The history storage unit 73 stores the passage history for each movement mode. The passage history also includes information on a time at which the user passes through each road.

The passage frequency calculation unit 74 reads out the passage history for each movement mode from the history storage unit 73 and calculates the passage frequency of each road on the basis of the passage history. The passage frequency calculation unit 74 stores the information on the passage frequency of each road in the search-use information storage unit 76 for each movement mode.

The registration information/attention information obtaining unit 75 identifies a favorite location of the user on the basis of the operation by the user with respect to the operation input unit 12. A registration of the favorite location is carried out, for example, when the user selects a predetermined location on the map displayed on the display unit 2. The registration information/attention information obtaining unit 75 stores the information on the identified favorite location of the user in the search-use information storage unit 76. The information on the favorite location includes position information on the favorite location and the information representing a degree of liking registered by the user.

Also, the registration information/attention information obtaining unit 75 controls the communication unit 16 to access the Web server and downloads and obtains the text data. For example, in a case where the Web server is a server for managing the bulletin board, the text data posted in the bulletin board is obtained.

The registration information/attention information obtaining unit 75 extracts names of the building, the shop, the park, and the like by analyzing the obtained text data. The registration information/attention information obtaining unit 75 identifies a location attracting attention from people who have posted among the locations such as the building, the shop, and the park which are placed on the map stored in the map data storage unit 78. Also, the registration information/attention information obtaining unit 75 obtains an attention degree of the identified attention location, for example, on the basis of the number of inclusions of the name of the same location in the text data. The registration information/attention information obtaining unit 75 stores the information on the attention location including the position information on the attention location and the information on the attention degree in the search-use information storage unit 76.

The search-use information storage unit 76 stores the information on the passage frequency of each road calculated by the passage frequency calculation unit 74 and the information on the favorite location and the information on the attention location supplied from the registration information/attention information obtaining unit 75 as the search-use information which is information used for searching for the route. The search-use information also includes information on each road on the map.

Figure 6:
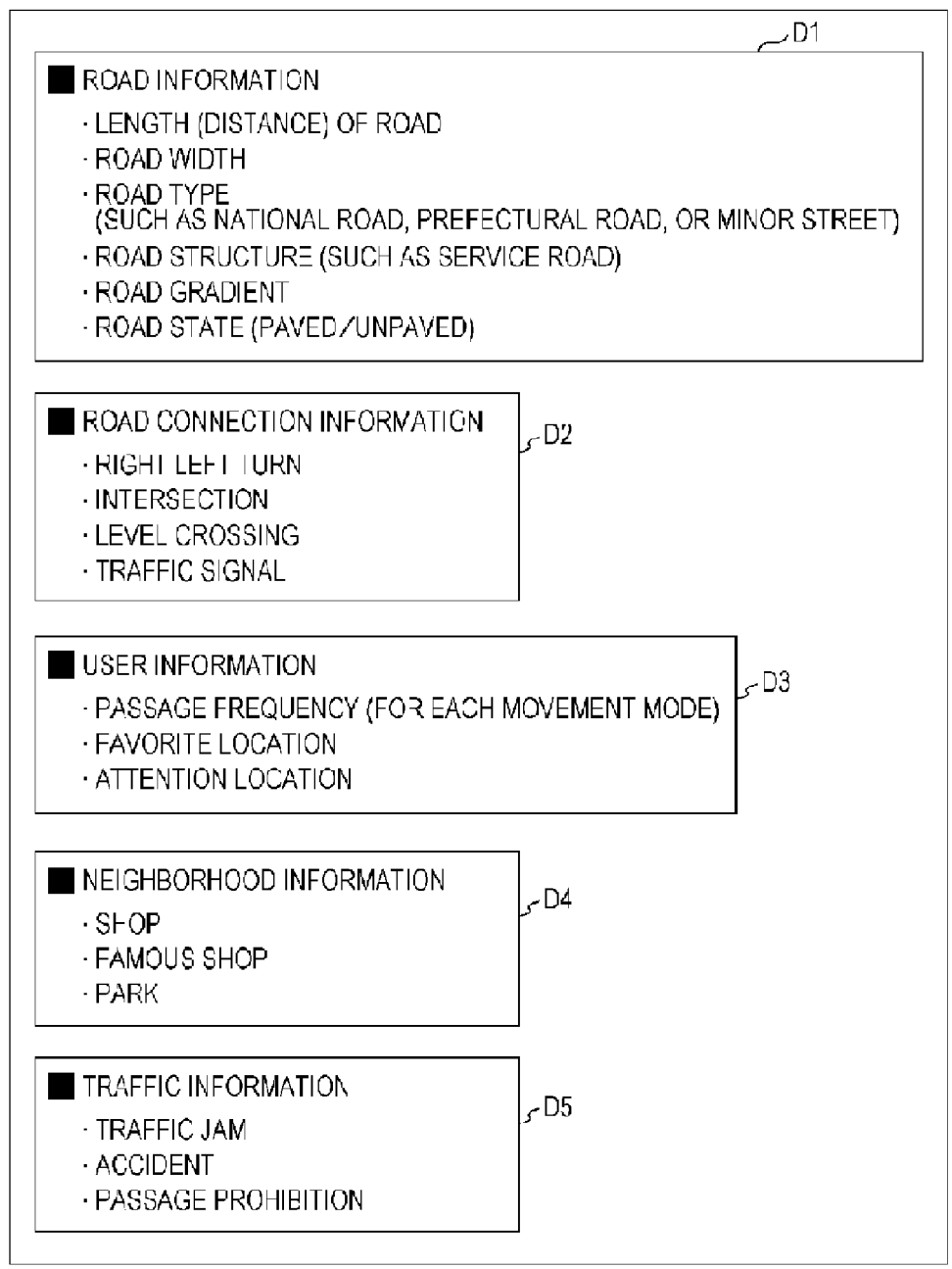
FIG. 6 illustrates an example of search-use information.

FIG. 6 illustrates an example of search-use information stored in the search-use information storage unit 76.

The search-use information includes road information D1, road connection information D2, user information D3, neighborhood information D4, and traffic information D5. Information other than the information illustrated in FIG. 6 may also be included in the search-use information. Also, a part of information among the information illustrated in FIG. 6 may also be used for carrying out the route search.

The road information D1 includes a length of each road on the map, a width of each road, a type of each road such as a national road, a prefectural road, a minor street, or a toll road, a road structure of each road such as whether it is a service road or not, a gradient of each road, and information on a state of each road such as whether it is a paved road or an unpaved road.

The road connection information D2 includes information representing a right-turn road or a left-turn road with regard to each road, information on the presence or absence of an intersection, information on the presence or absence of a level crossing, and information on the presence or absence of a traffic signal.

The user information D3 includes the information on the passage frequency of each road for each movement mode, the information on the favorite location, and the information on the attention location. The information on the passage frequency included in the user information D3 is registered by the passage frequency calculation unit 74, and the information on the favorite location and the information on the attention location are registered by the registration information/attention information obtaining unit 75.

The neighborhood information D4 includes the information on the shop on the map and the information on the park.

The traffic information D5 includes information on the presence or absence of the generation of traffic jam, the presence or absence of the generation of a traffic accident, and the presence or absence of the generation of a passage prohibition.

While referring back to the description of FIG. 5, in a case where a predetermined position on the map is set as the destination by the user and the search for the route from the current position to the destination is instructed, in accordance with the search mode, the search unit 77 reads out predetermined information from the search-use information storage unit 76. The search mode includes a mode for carrying out the search for the route including the road different from the usual road and a mode for carrying out a normal search in priority to a distance or in priority to a time.

For example, in a case where the conduct of the search for the route including the road different from the usual road is instructed, the search unit 77 reads out the entire search-use information of FIG. 6 including the information on the passage frequency. Also, in a case where the conduct of the normal search is instructed the search unit 77 reads out information at least except for the information on the passage frequency among the search-use information of FIG. 6. That is, the information on the passage frequency used for the route search in a case where the search for the route including the road different from the usual road is carried out.

The search unit 77 performs the search for the route from the current position to the destination on the basis of the information read out from the search-use information storage unit 76. For an algorithm of the route search, for example, Dijkstra method of obtaining a cost of each route from the current position to the destination and select a route with a low cost is used. Other search algorithms such as Λ-star method may also be used. It should be noted that the current position is identified on the basis of the location detected by the position detection unit 14. The search unit 77 outputs the information on the route of the search result to the display control unit 79.

The map data storage unit 78 stores the map data and the POI information.

In a case where the information on the route of the search result is supplied from the search unit 77, the display control unit 79 reads out the map data in a range including the route of the search result from the map data storage unit 78 and generates screen information illustrated in FIG. 2 where the route of the search result is displayed on the map. The display control unit 79 outputs the generated screen information to the user interface unit 51 and causes the display unit 2 to display the route of the search result.

<Operation of Information Processing Terminal>

Herein, an operation by the information processing terminal 1 will be described. First, with reference to a flow chart of FIG. 7, a processing of the information processing terminal 1 that accumulates the passage history will be described.

Figure 7:
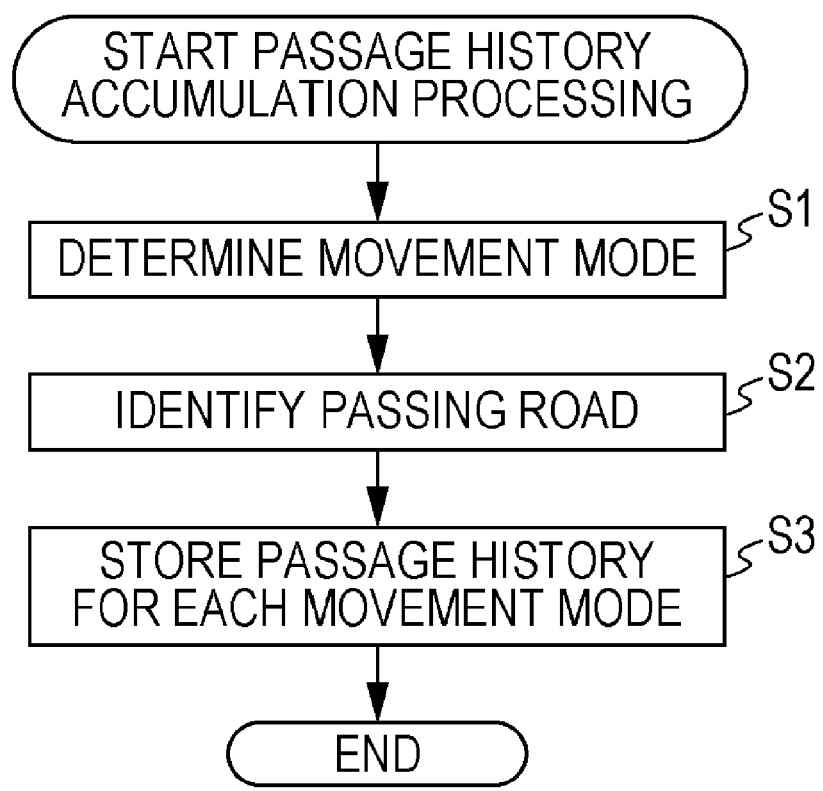
FIG. 7 is a flow chart for describing a passage history accumulation processing of the information processing terminal.

The processing of FIG. 7 is repeatedly carried out, for example, when the power source of the information processing terminal 1 is turned ON and the user uses the information processing terminal 1. When the power source of the information processing terminal 1 is turned ON, the positioning is carried out by the position detection unit 14 to detect the current position.

In step S1, the movement mode detection unit 71 determines the movement mode of the user on the basis of the information supplied from the attachment detachment detection unit 17.

In step S2, the history management unit 72 identifies a road through which the user passes on the basis of the current position detected by the position detection unit 14 and the map data stored in the map data storage unit 78.

In step S3, the history management unit 72 stores the information on the passing road in the history storage unit 73 for each movement mode and ends the processing. The processing of FIG. 7 is repeatedly carried out, and the passage history in a case where the movement mode is on foot, the passage history in the case of the car, and the passage history in the case of the bicycle are respectively stored in the history storage unit 73.

Figure 8:
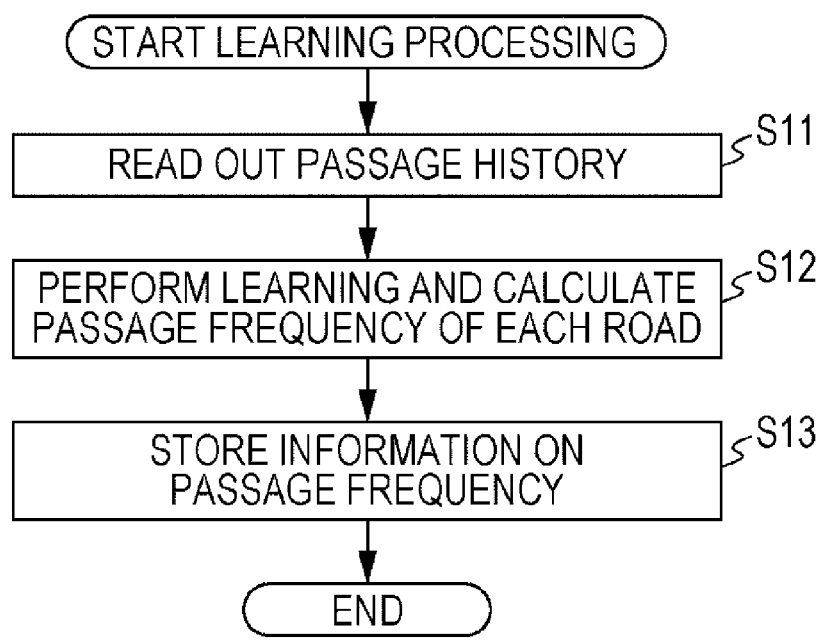
FIG. 8 is a flow chart for describing a learning processing of the information processing terminal.

Next, with reference to a flow chart of FIG. 8, a learning processing by the information processing terminal 1 will be described. The processing of FIG. 8 is carried out at a predetermined timing each time the passage history is stored in the history storage unit 73 or the like.

In step S11, the passage frequency calculation unit 74 reads out the information on the passage history for a predetermined movement mode from the history storage unit 73.

In step S12, the passage frequency calculation unit 74 performs the learning of the passage history read out from the history storage unit 73 to calculate the passage frequency of each road.

In step S13, the passage frequency calculation unit 74 stores the information on the passage frequency obtained through the calculation in the search-use information storage unit 76 and ends the processing.

Figure 9:
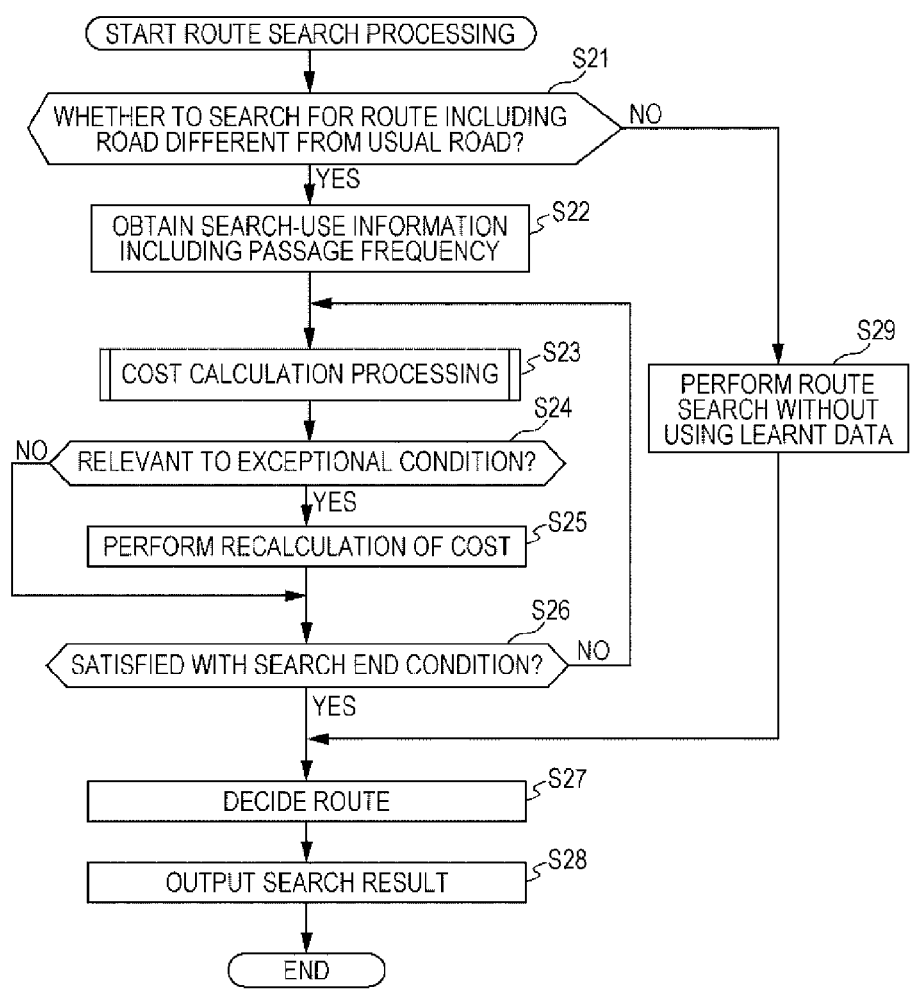
FIG. 9 is a flow chart for describing a route search processing of the information processing terminal.

Next, with reference to a flow chart of FIG. 9, a processing of the information processing terminal 1 for performing the route search will be described. The processing of FIG. 9 is started, for example, when a predetermined position on the map is set as the destination by the user and the search for the route from the current position to the destination is instructed.

After the destination is set, a menu screen used for settings with regard to the search is displayed on the display unit 2. By using the menu screen, the user can perform various settings regard to the search such as a selection to perform the search for the route including the road different from the usual road and a selection to avoid the toll road. Information representing the selected contents by the user is detected by the operation input unit 12 and supplied to the search unit 77.

In step S21, the search unit 77 determines whether or not the search for the route including the road different from the usual road is carried out.

In a case where it is determined in step S21 that the search for the route including the road different from the usual road is performed, in step S22, the search unit 77 reads out the search-use information including the information on the passage frequency in accordance with the movement mode from the search-use information storage unit 76. For example, in a case where the movement mode detection unit 71 determines that the movement mode of the user is on foot, the search-use information storage unit 76 reads out the search-use information including the information on the passage frequency learnt on the basis of the passage history on foot from the search-use information storage unit 76.

In step S23, the search unit 77 performs a cost calculation processing. A cost of an arbitrary route to the destination is calculated through the cost calculation processing.

Herein, with reference to a flow chart of FIG. 10, the cost calculation processing performed in step S23 of FIG. 9 will be described.

In step S41, the search unit 77 obtains setting information related to the calculation of the cost among the settings by the user with regard to the search. The selection to avoid the toll road and the like become the settings related to the calculation of the cost.

In step S42, the search unit 77 sets weights on the respective parameters of the search-use information and calculates the cost of the arbitrary route.

Figure 11:
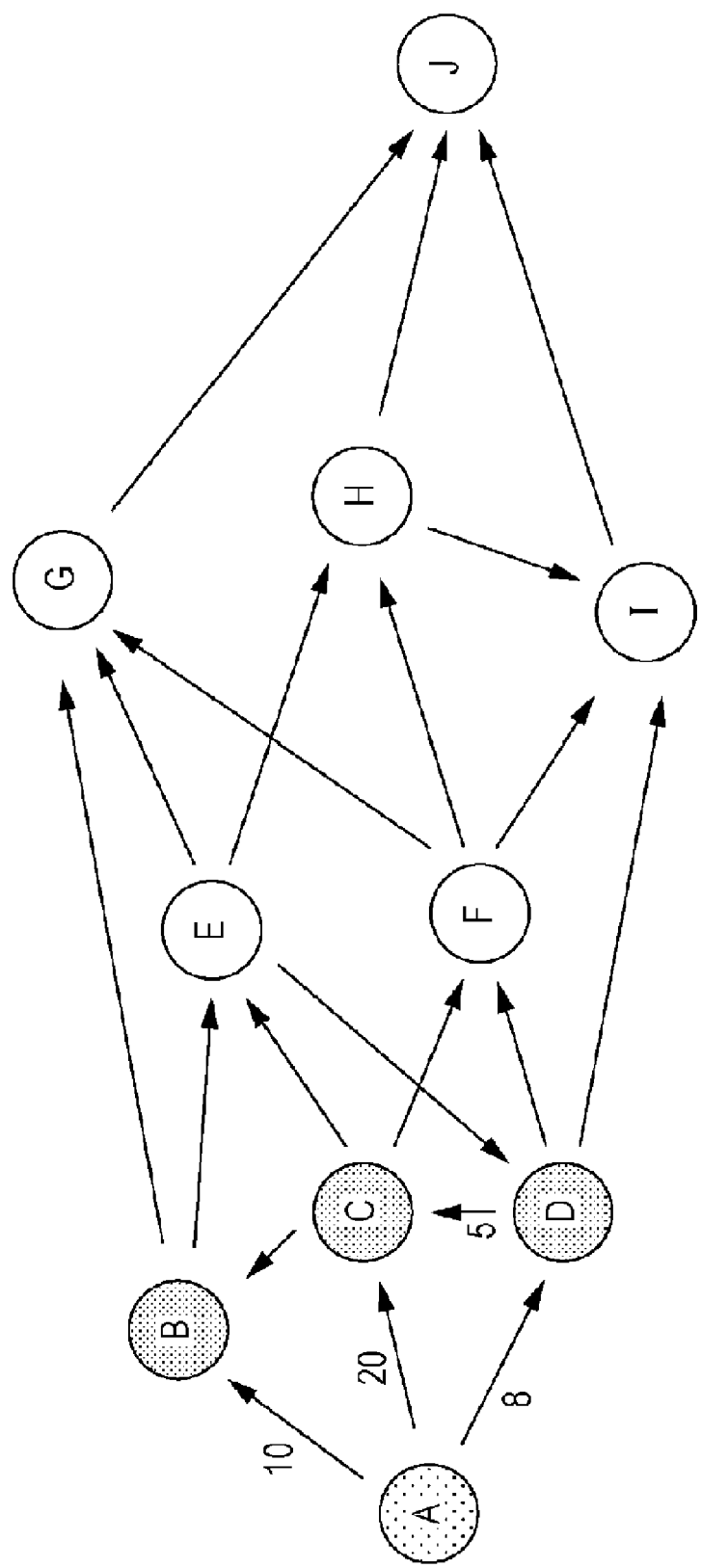
FIG. 11 is a diagram for describing a cost calculation.

FIG. 11 is a diagram for describing the cost calculation. An edge indicated by an arrow corresponds to one road, and nodes on both ends of the edge correspond to two points connected by the road. A direction of the arrow indicating the edge represents a direction in which the passage can be made. A node corresponding to the current position is set as the node A, and a node corresponding to the destination is set as a node J.

In this case, first, the respective costs of the nodes between A-B, the nodes between A-C, the nodes between A-D, the nodes between A-D-C, and the nodes between A-C-B which are routes to the nodes B, C, and D which are locations adjacent to the node A are calculated.

For example, the cost between the nodes A-B can be obtained in the following manner by using the respective parameters of FIG. 6. The parameter of the road information D1 and the parameter of the road connection information D2 are the parameter related to a road A-B which is a road connecting the locations corresponding to the node A and the node B. Weights w by which the respective parameters are multiplied are changed in accordance with the setting information obtained in step S41 or the like.

Cost between the nodes $A$-$B$=(length of the road)×$w11$+(width of the road)×$w12$+(type of the road)×$w13$+(structure of the road)×$w14$+(gradient of the road)×$w15$+(state of the road)×$w16$+(left right turn)×$w21$+(intersection)×$w22$+(the presence of the absence of the level crossing)×$w23$+(the presence or absence of the traffic signal)+$w24$+(passage frequency)×$w31$+(favorite location)×$w32$+(attention location)×$w33$+ . . .

In this example, since the conduction of the search for the route including the road different from the usual road is instructed, the information on the passage frequency is also used in the cost calculation. The other parameters illustrated in FIG. 6 are also appropriately used in the calculation of the cost between the nodes A-B. The weighting may also be carried out on parameters such as a time and consumed calorie other than the parameters illustrated in FIG. 6 and used for the calculation of the cost.

The weight $w31$ by which the parameter of the passage frequency is multiplied becomes a larger value as the passage frequency of the road A-B is higher and becomes a smaller value as the passage frequency is lower. According to this, in a case where the parameter of the passage frequency is used for the cost calculation, the obtained cost becomes larger as the passage frequency is higher and becomes smaller as the passage frequency is lower. According to this, a route including a road where a passage frequency is low becomes more likely to be searched for.

The weights w by which the respective parameters are multiplied are changed by the movement mode of the user. For example, in a case where the movement mode is on foot, the weight $w12$ by which a parameter of the width of the road A-B is multiplied is set to be smaller than that in the case where the movement mode is on foot or by bicycle. According to this, in a case where the movement mode is on foot, a route including a narrow road becomes more likely to be searched for.

Also, in a case where the movement mode is on foot, the weight $w15$ by which parameter on the gradient of the road A-B is multiplied is set to be larger than that in the case where the movement mode is on foot or by bicycle. According to this, in a case where the movement mode is on foot, a route including a road with a large gradient becomes more unlikely to be searched for.

Similarly, also in a case where the movement mode is by bicycle, the weight $w12$ by which the parameter of the width of the road the road A-B is set to be smaller than that in the case where the movement mode is on foot or by bicycle. According to this, in a case where the movement mode is by bicycle, a route including a narrow road becomes more likely to be searched for.

Also, in a case where the movement mode is by bicycle, the weight $w15$ by which the parameter on the gradient of the road A-B is multiplied is set to be larger than that in the case where the movement mode is on foot or by bicycle. According to this, in a case where the movement mode is by bicycle, a route including a road with a large gradient becomes more unlikely to be searched for.

On the basis of the information on the gradient of the road included in the passage history, a determination is made on to which extent of the gradient the user can pass for each movement mode, and the weight $w15$ by which the parameter of the gradient of the road is set, so that it is also possible to carry out the route search. For example, in a case where the movement mode is on foot or by bicycle, the weight $w15$ becomes larger than the case where the movement mode is on foot or by bicycle.

In this manner, in the information processing terminal 1, it is possible to carry out the search for the route while taking into account the width of the road and the gradient of the road in accordance with the movement mode.

For the parameter of the favorite location, for example, a predetermined value such as "1" is set in a case where the favorite location registered by the user exists in a predetermined range while a location on the straight line connecting the current position with the destination is set as a reference and is used for the cost calculation. For the weight $w32$ by which the parameter of the favorite location is multiplied, a larger value is set as the favorite location is closer to the reference location or the degree of liking is larger. In a case where the favorite location is registered by the user but the location does not exist in the predetermined range, "0" is set as the value of the parameter of the favorite location and is not used for the cost calculation.

For the parameter of the attention location, for example, in a case where the attention location exists within a predetermined range while the straight line connecting the current position with the destination is set as the reference, a predetermined value such as "1" is set and is used for the cost calculation. For the weight w33 by which the parameter of the attention location is multiplied, a larger value is set as the attention location is closer to the reference location or a degree of attention is larger. In a case where the attention location does not exist within the predetermined range, "0" is set as the value of the parameter of the attention location and is not used for the cost calculation.

In the example of FIG. 11, it is obtained in a manner that the cost between the nodes A-B is 10, the cost between the nodes A-C is 20, the cost between the nodes A-D is 8, and the cost between the nodes A-D-C is 13 (8+5). In this case, routes from the node A toward the node C include the route between the nodes A-C and the route between the nodes A-D-C, but the route between the nodes A-C where the cost is large is removed from the candidate, and the route between the nodes A-D-C remains as the candidate. By repeatedly carrying out the above-mentioned cost calculation, the search unit 77 obtains the cost of each route.

For example, in a case where the calculation for the cost for an arbitrary route from the current position to the destination such as the nodes A-D-C-F-I-J is carried out, while returning back to step S23 of FIG. 9, the subsequent processing is carried out.

In step S24, the search unit 77 determines whether or not the route where the cost has been calculated is relevant to the exceptional condition.

Figure 12:
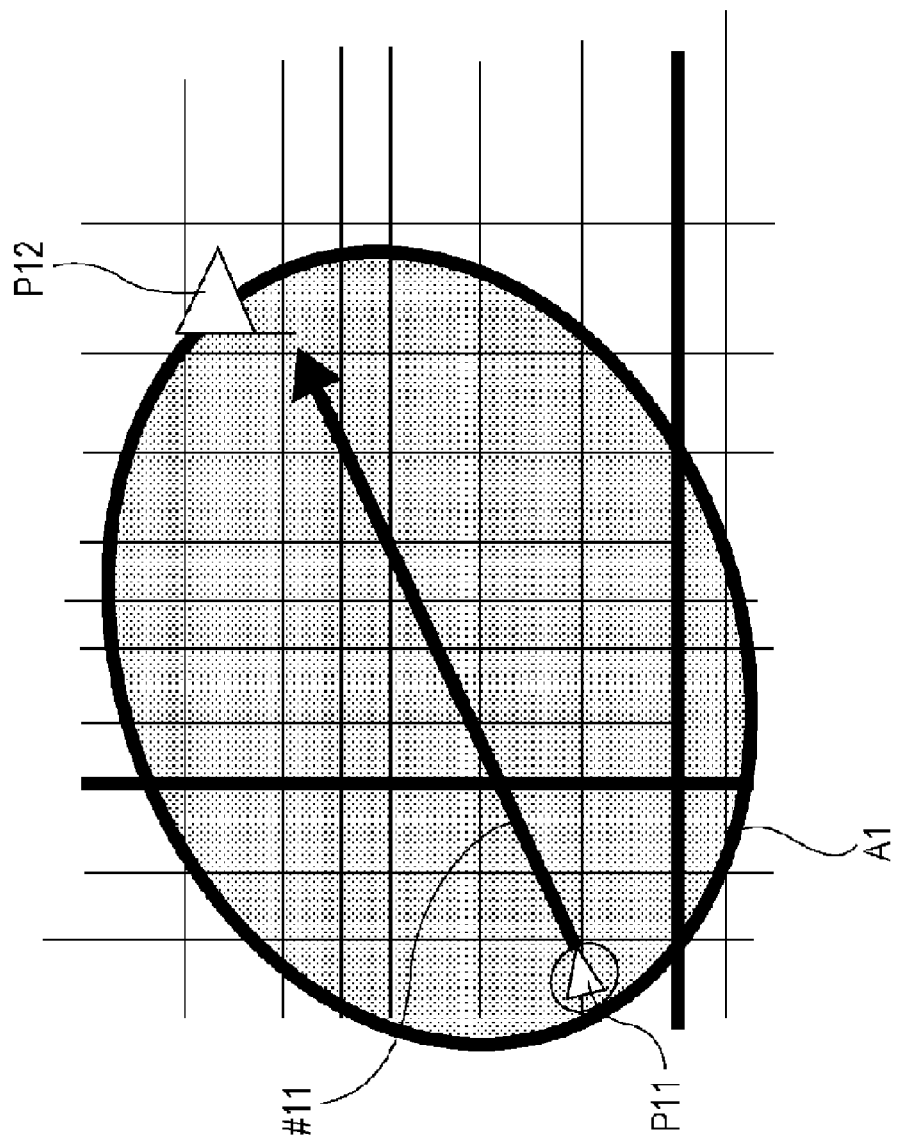
FIG. 12 is a diagram for describing an exception condition determination.

FIG. 12 is a drawing for describing the determination on the exceptional condition. As illustrated in FIG. 12, while a position P11 is set as the current position and a position P12 is set as the destination, a case will be described in which a route from the position P11 to the position P12 is searched for.

In this case, for example, the search unit 77 sets an elliptic area having a straight line obtained by extending a straight line #11 connecting the position P11 with the position P12 by a predetermined length as a major axis as an area A1. The area A1 includes the current position and the destination.

The search unit 77 determines a route out of the area A1 as a route relevant to the exceptional condition. It may be determined to be relevant to the exceptional condition in a case where a part of the roads constituting the entire route exceeds the area A1, and also it may be determined to be relevant to the exceptional condition in a case where a road having a distance at a predetermined rate with respect to the distance of the entire route exceeds the area A1. According to this, it is possible to prevent a search for a route where a distance to the destination becomes too far. Furthermore, the user may choose to expand the area A1 if the user has more available time to reach the destination. For example, the user may choose to input "extra-time" available to the user so that the user can possibly explore more locations of interest that would fall within the area A1. Moreover, if the user decides he has more extra time to reach the destination, the user may select a broader area A1 so the user can experience new routes and locations of interest along unfamiliar passageway segments.

Figure 13:
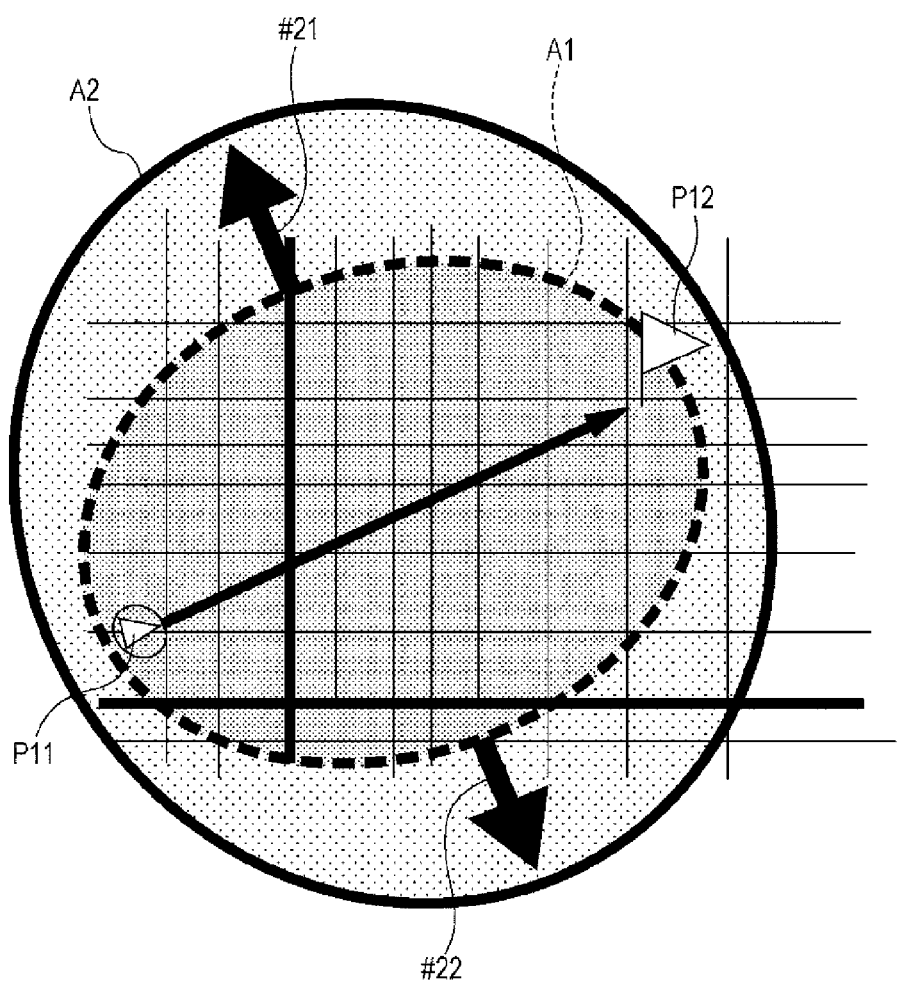
FIG. 13 is another diagram for describing the exception condition determination.

In accordance with a situation of the learning on the passage frequency, the area functioning as the reference of the determination on the exceptional condition may be changed as illustrated in FIG. 13. In the example of FIG. 13, the area A1 of FIG. 12 is expanded as indicated by arrows #21 and #22 to be extended to a range of an area A2. As the information amount on the passage history becomes larger and the learning on the passage frequency progresses, by setting the elliptic area functioning as the reference of the determination on the exceptional condition to be large, it is possible to expand the range of the route including the road different from the usual road.

While returning back to the description of FIG. 9, in a case where it is determined in step S24 that the route where the cost has been calculated is relevant to the exceptional condition, in step S25, the search unit 77 performs the recalculation of the cost.

Figure 10:
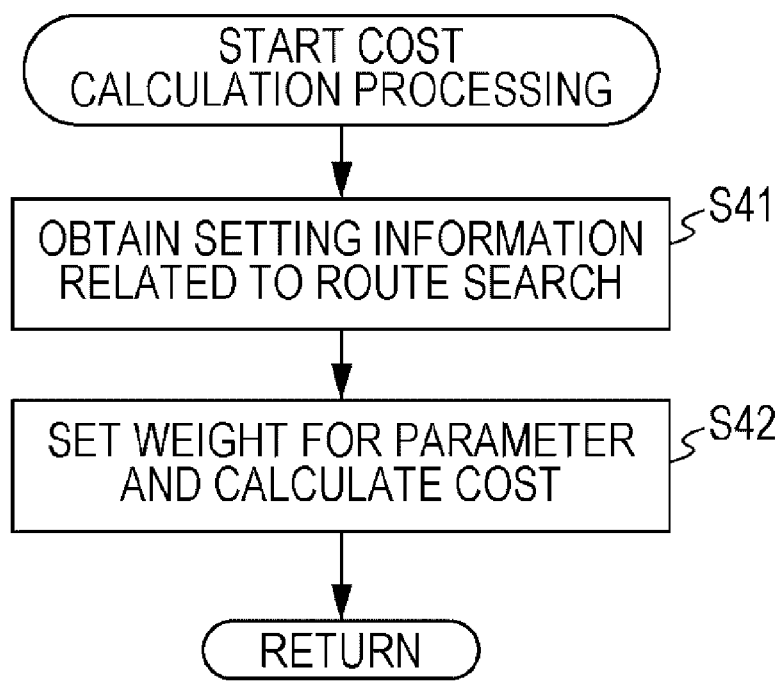
FIG. 10 is a flow chart for describing a cost calculation processing performed in step S23 of FIG. 9.

The recalculation of the cost is realized by changing the setting on the weight so that the cost of the route determined to be relevant to the exceptional condition becomes high and performing a processing similar to the processing of FIG. 10. Finally, since the route where the total of the costs of the respective roads constituting the route is low is selected as the search result, the route relevant to the exceptional condition becomes unlikely to be selected as the search result. In a case where it is determined in step S24 that the route where the cost has been calculated is not relevant to the exceptional condition, the processing in step S25 is skipped.

In step S26, the search unit 77 determines whether or not a search end condition is satisfied. For example, in a case where the calculation for the cost for a predetermined number of routes is ended, it is determined that the search end condition is satisfied. In a case where it is determined in step S26 that the search end condition is not satisfied, the search unit 77 returns to step S23 and calculates a cost of another route from the current position to the destination.

On the other hand, in a case where it is determined in step S26 that the search end condition is satisfied, in step S27, the search unit 77 decides the route having the lowest total of the costs of the respective roads constituting the route as the search result. The search unit 77 outputs information representing the decided route of the search result to the display control unit 79.

In step S28, the display control unit 79 displays the map in a predetermined range on the display unit 2 on the basis of the data stored in the map data storage unit 78 and displays the route of the search result on the displayed map. It should be noted that the icons representing the locations of the cake shop, the monument, and the park illustrated in FIG. 2 are stored, for example, in the map data storage unit 78.

At the time of the display of the route of the search result, information on the rate of the roads different from the usual road (roads having a lower passage frequency than a threshold) among the entire roads constituting the route of the search result may be displayed.

Also, a color of the road different from the usual road may be displayed in a different color from a color of the road having a higher passage frequency than the threshold, or the width of the road different from the usual road may be displayed in a width different from the width of the road having the higher passage frequency than the threshold. According to this, the user can easily check the road different from the usual road.

On the other hand, in a case where it is determined in step S21 that the search for the route including the road different from the usual road is not carried out, in step S29, the search unit 77 performs a normal route search without using the learning data. The normal route search is the same as the above-mentioned search except for a point that the information on the passage frequency among the search-use information is not used for the route search.

The route that becomes the search result is decided in step S27 on the basis of the costs of the respective routes obtained through the normal search and is displayed on the display unit 2 in step S28.

Through the above-mentioned processing, the user can check the road where the passage frequency is low and can go to the destination by moving by following the displayed route with use of the road different from the usual road.

Also, the user does not have to examine the route using the road different from the usual road by itself, and it is possible to avoid the trouble. In a case where the route using the road different from the usual road is examined by itself, the user has to relay on memories and perform an operation of considering which road the user has not passed through by itself and setting a via point, but it is possible to avoid such trouble. The time taken by checking the route using the road different from the usual road can be shortened, and it is possible to improve the usability of the user.

Since the processings of FIG. 7 to FIG. 9 are repeatedly carried out, the information processing terminal 1 also starts guiding a side road having a low passage frequency and a narrow width which the user may not remember. According to this, from the viewpoint of presenting the route using the road different from the usual road, it is possible to improve the quality of the guided route.

In a case where the user examines the route using the road different from the usual road by itself, the route of the examination result may become an unrealistic route going a long way round, but the above-mentioned circumstance can be avoided by carrying out the determination on the exceptional condition. Also, by accumulating the passage history for each movement mode of the user and carrying out the route search while taking into account the passage frequency for each movement mode, the information processing terminal 1 can guide the route including the road different from the usual road for each movement mode.

Second Embodiment

Configuration of Communication System

Figure 14:
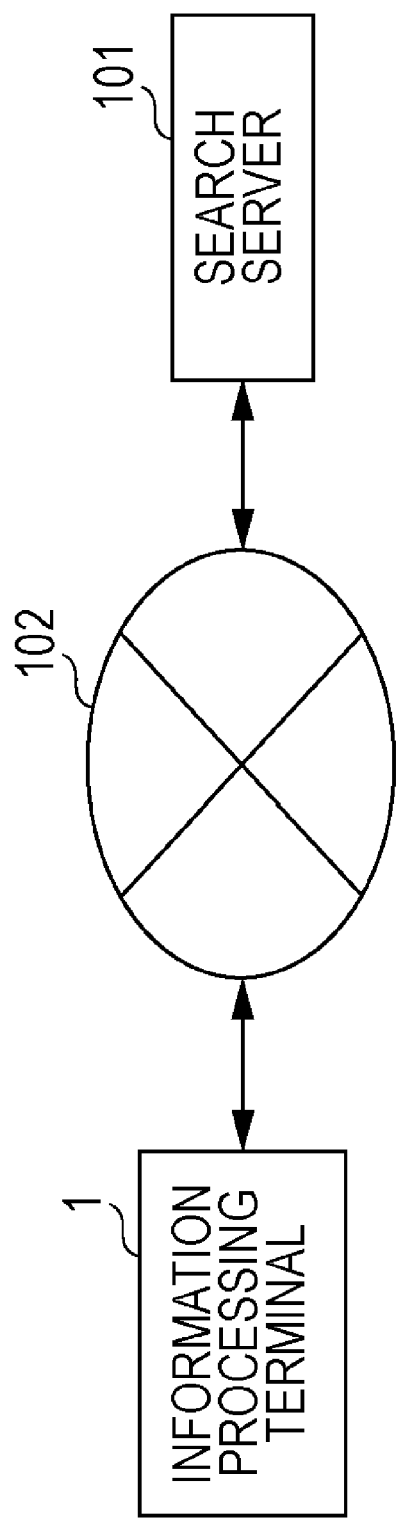
FIG. 14 illustrates a configuration example of a communication system.

FIG. 14 illustrates a configuration example of a communication system.

The communication system of FIG. 14 is constructed by connecting the information processing terminal 1 with a search server 101 via a network 102.

In the communication system of FIG. 14, transmission and reception of various pieces of information are carried out between the information processing terminal 1 and the search server 101, and the search for the route using the road different from the usual road or the like is carried out by the search server 101. A plurality of terminals having a configuration similar to the information processing terminal 1 are connected to the search server 101 via the network 102.

That is, at the time of the accumulation of the passage history by the user, the information processing terminal 1 determines the movement mode of the user and transmits the information on the movement mode and the information on the current position to the search server 101.

The search server 101 receives the information transmitted from the information processing terminal 1 and manages the passage history of the user of the information processing terminal 1 for each movement mode. Also, the search server 101 calculates and manages the passage frequency of each road by the user of the information processing terminal 1.

In a case where the search for the route to the predetermined destination is requested from the information processing terminal 1, while following the request from the information processing terminal 1, the search server 101 performs the search for the route as described with reference to FIG. 9. The search server 101 transmits the information on the route of the search result to the information processing terminal 1 to be displayed on the display unit 2 of the information processing terminal 1.

In this manner, it can also be set that the route search taking the passage frequency of the user of the information processing terminal 1 or the like into account is carried out in the search server 101.

<Configurations of Respective Apparatuses>

Figure 15:
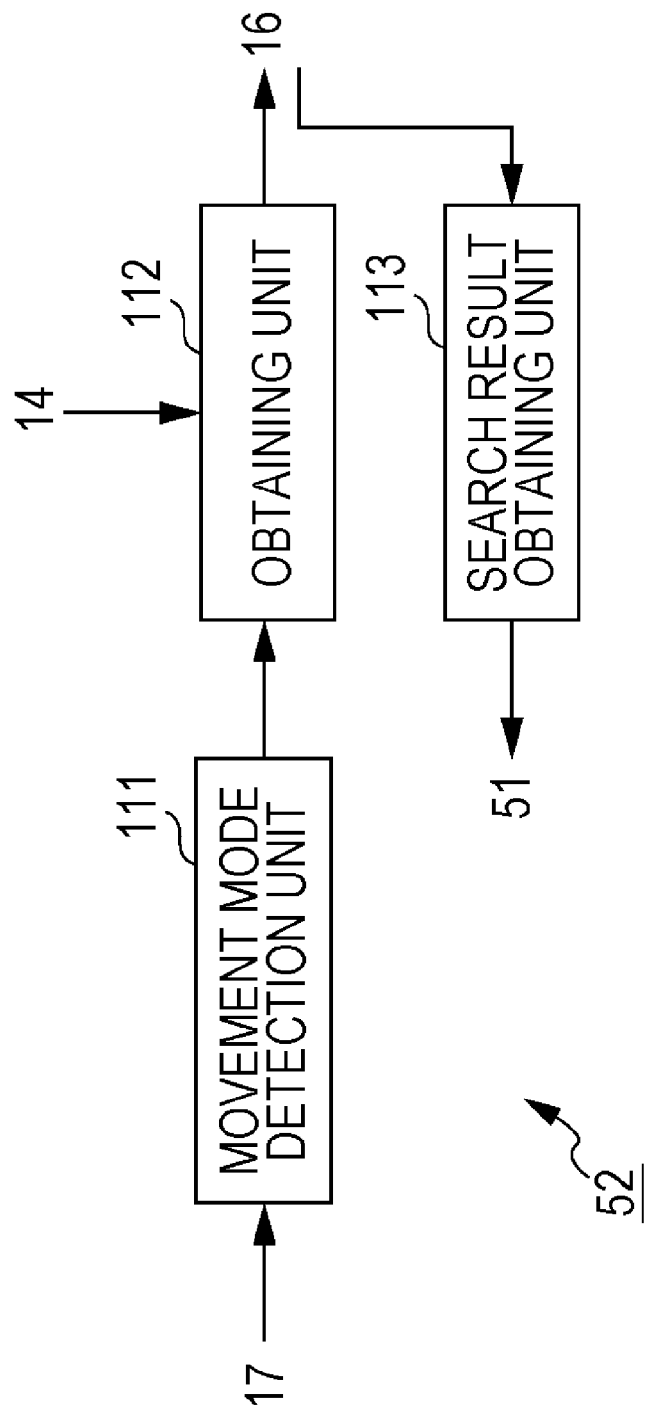
FIG. 15 is a block diagram illustrating a configuration example of the information processing unit.

FIG. 15 is a block diagram illustrating a configuration example of the information processing unit 52 that the information processing terminal 1 of FIG. 14 has. A hardware configuration of the information processing terminal 1 of FIG. 14 is the same as the configuration of FIG. 3. In the information processing terminal 1, a movement mode detection unit 111, an obtaining unit 112, and a search result obtaining unit 113 are realized while predetermined programs are executed by the CPU 31.

At the time of the accumulation of the passage history or at the time of the search for the route, similarly as in the movement mode detection unit 71 of FIG. 5, the movement mode detection unit 111 determines the movement mode of the user on the basis of the attachment detachment state with respect to the cradle which is detected by the attachment detachment detection unit 17. The movement mode detection unit 111 outputs the information representing the determined movement mode of the user to the obtaining unit 112.

The obtaining unit 112 obtains the information supplied from the movement mode detection unit 111 at the time of the accumulation of the passage history and the information on the current position detected by the position detection unit 14 when the user moves while carrying about the information processing terminal 1. The obtaining unit 112 controls the communication unit 16 and transmits the information representing the movement mode of the user and the information on the current position to the search server 101.

Also, at the time of the search for the route, the obtaining unit 112 obtains the information supplied from the movement mode detection unit 111, the information on the current position detected by the position detection unit 14, and the information on the destination set by the user. The obtaining unit 112 transmits the information on the current position and the information on the destination together with the information on the movement mode and the information on various settings related to the search to the search server 101 and requests the search for the route. The settings related to the search include, for example, information for instructing the search for the route using the road different from the usual road.

The search result obtaining unit 113 controls the communication unit 16 and obtains the information on the search result transmitted from the search server 101. By controlling the user interface unit 51 or the like, the search result obtaining unit 113 displays the route of the search result on the display unit 2 to be presented to the user.

Figure 16:
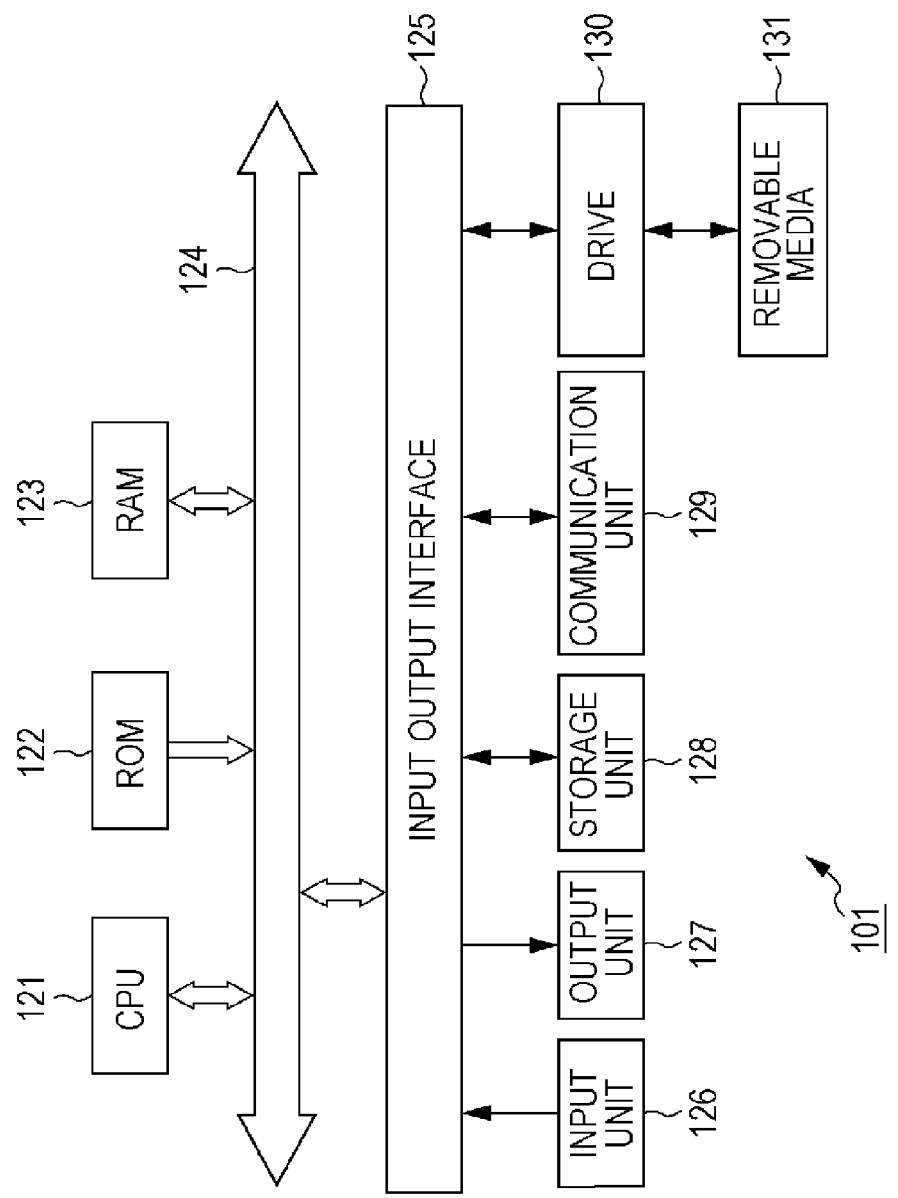
FIG. 16 is a block diagram illustrating a configuration example of hardware of a search server.

FIG. 16 is a block diagram illustrating a configuration example of hardware of the search server 101.

A CPU 121, a ROM 122, and a RAM 123 are mutually connected by a bus 124.

An input output interface 125 is further connected to the bus 124. An input unit 126 composed of a key board and a mouse and an output unit 127 composed of a display, a speaker, and the like are connected to the input output interface 125. Also, a storage unit 128 composed of a hard disc, a non-volatile memory, or the like, a communication unit 129 that is composed of a network interface or the like and performs a communication with the information processing terminal 1 via the network 102, and a drive 130 for driving removable media 131 are connected to the input output interface 125.

Figure 17:
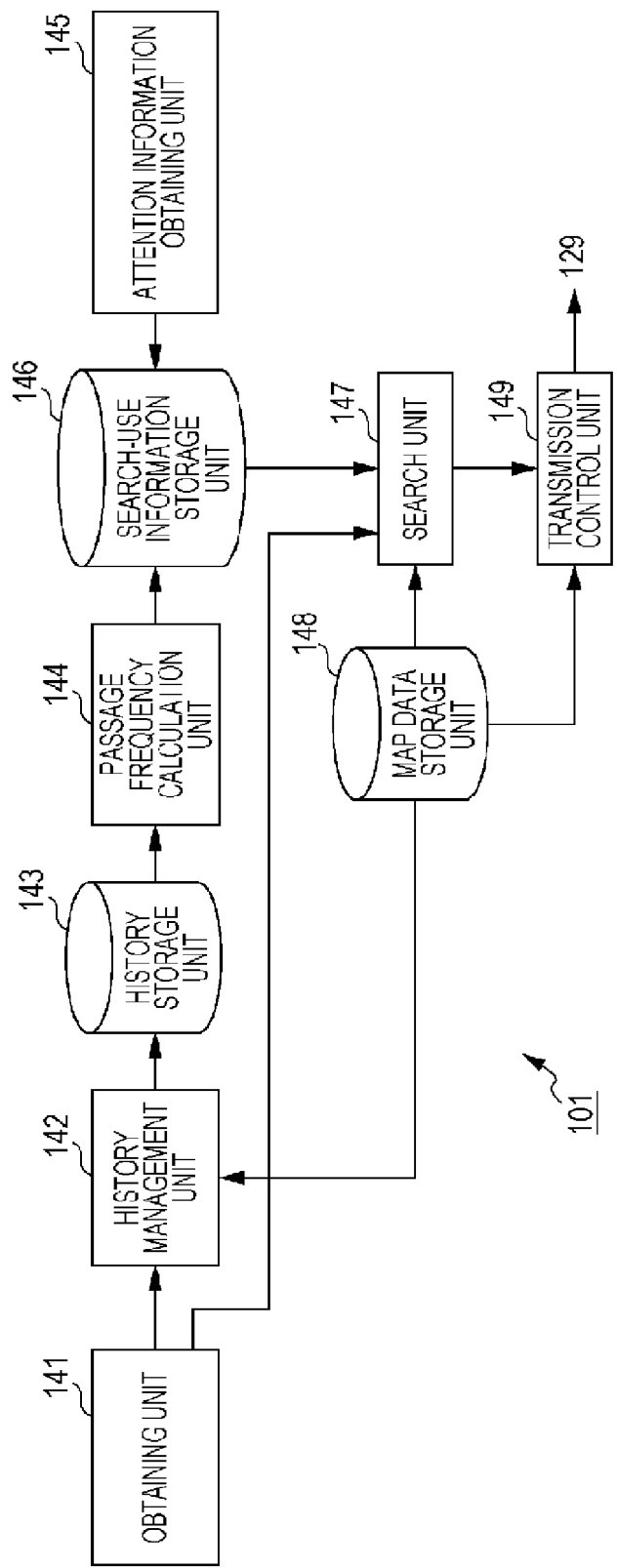
FIG. 17 is a block diagram illustrating a function configuration example of the search server.

FIG. 17 is a block diagram illustrating a function configuration example of the search server 101. In the search server 101, while a predetermined program is executed by the CPU 121 of FIG. 16, a part of the configuration illustrated in FIG. 5 is realized.

In the search server 101, an obtaining unit 141, a history management unit 142, a history storage unit 143, a passage frequency calculation unit 144, an attention information obtaining unit 145, a search-use information storage unit 146, a search unit 147, a map data storage unit 148, and a transmission control unit 149 are realized.

The history management unit 142 corresponds to the history management unit 72 of FIG. 5, and the history storage unit 143 corresponds to the history storage unit 73 of FIG. 5. The passage frequency calculation unit 144 corresponds to the passage frequency calculation unit 74 of FIG. 5, and the attention information obtaining unit 145 corresponds to the registration information/attention information obtaining unit 75 of FIG. 5. The search-use information storage unit 146 corresponds to the search-use information storage unit 76 of FIG. 5, the search unit 147 corresponds to the search unit 77 of FIG. 5, and the map data storage unit 148 corresponds to the map data storage unit 78 of FIG. 5. A redundant description will be appropriately omitted.

The obtaining unit 141 controls the communication unit 129 and obtains the information transmitted from the information processing terminal 1. At the time of the accumulation of the passage history, the obtaining unit 141 outputs the information representing the movement mode of the user and the information on the current position transmitted from the information processing terminal 1 to the history management unit 142. Also, at the time of the search for the route, the obtaining unit 141 outputs the information representing the movement mode of the user, the information on the current position, the information on the destination, and the information on the setting transmitted from the obtaining unit 141 to the search unit 147.

The history management unit 142 obtains the information representing the movement mode of the user and the information on the current position supplied from the obtaining unit 141. The history management unit 142 identifies the road through which the user of the information processing terminal 1 passes by carrying out the matching with the map data stored in the map data storage unit 148 or the like and stores the information on the passed road as the passage history in the history storage unit 143 for each movement mode.

The history storage unit 143 stores the passage history of the user of the information processing terminal 1 for each movement mode. The passage history also includes information on the times at which the user has passed the respective road and identification information of the information processing terminal 1.

At the time of the learning on the passage frequency of the user of the information processing terminal 1, the passage frequency calculation unit 144 reads out the passage history for each movement mode of the user of the information processing terminal 1 from the history storage unit 143 to calculate the passage frequency of each road. The passage frequency calculation unit 144 stores the information on the passage frequency of each road in the search-use information storage unit 146 for each movement mode.

The attention information obtaining unit 145 controls the communication unit 129 to access the Web server and downloads and obtains text data. The attention information obtaining unit 145 identifies the attention location by analyzing the obtained text data. The attention information obtaining unit 145 stores the information on the attention location including the position information on the attention location and the information on the attention degree in the search-use information storage unit 146.

The search-use information storage unit 146 stores the information on the passage frequency of each road calculated by the passage frequency calculation unit 144 and the information on the attention location supplied from the attention information obtaining unit 145 as the search-use information. The search-use information includes the information illustrated in FIG. 6.

In a case where the information representing the movement mode of the user of the information processing terminal 1, the information on the current position, the information on the destination, and the information on the setting of the route search are supplied from the obtaining unit 141, in accordance with the search mode, the search unit 147 reads out predetermined information from the search-use information storage unit 146. On the basis of the information read out from the search-use information storage unit 146, the search unit 147 performs the search for the route to the destination as described with reference to FIG. 9, for example. The search unit 147 outputs the information on the route of the search result to the transmission control unit 149.

The map data storage unit 148 stores the map data and the POI information.

In a case where the information on the route of the search result is supplied from the search unit 147, the transmission control unit 149 reads out the map data in a range including the route of the search result from the map data storage unit 148 and generates information on a screen where the route of the search result is displayed on the map. The transmission control unit 149 transmits the generated screen information to the information processing terminal 1 and displays the route of the search result on the display unit 2.

The map data may be prepared in the information processing terminal 1. In this case, only the information on the route of the search result is transmitted from the search server 101, and in the information processing terminal 1 receiving it, the route of the search result is displayed on the map.

<Operations of Respective Apparatuses>

Herein, operations of the information processing terminal 1 of FIG. 14 and the search server 101 will be described. First, with reference to a flow chart of FIG. 18, the processing of the information processing terminal 1 that transmits the passage history will be described.

In step S101, the movement mode detection unit 111 of the information processing terminal 1 (FIG. 15) determines the movement mode of the user on the basis of the information supplied from the attachment detachment detection unit 17.

In step S102, the position detection unit 14 performs the positioning to detect the current position.

In step S103, the obtaining unit 112 transmits the information representing the movement mode of the user and the information on the current position to the search server 101 and ends the processing.

Next, with reference to a flow chart of FIG. 19, a processing of the search server 101 that manages the passage history of the user of the information processing terminal will be described. The processing of FIG. 19 is carried out in accordance with the conductance of the processing of FIG. 18 in the information processing terminal 1.

In step S111, the obtaining unit 141 of the search server 101 (FIG. 17) obtains the information representing the movement mode of the user and the information on the current position transmitted from the information processing terminal 1.

In step S112, the history management unit 142 identifies the road through which the user of the information processing terminal 1 passes on the basis of the information on the current position obtained by the obtaining unit 141. The history management unit 142 stores the passage history of the user of the information processing terminal 1 for each movement mode in the history storage unit 143 and ends the processing.

Figure 18:
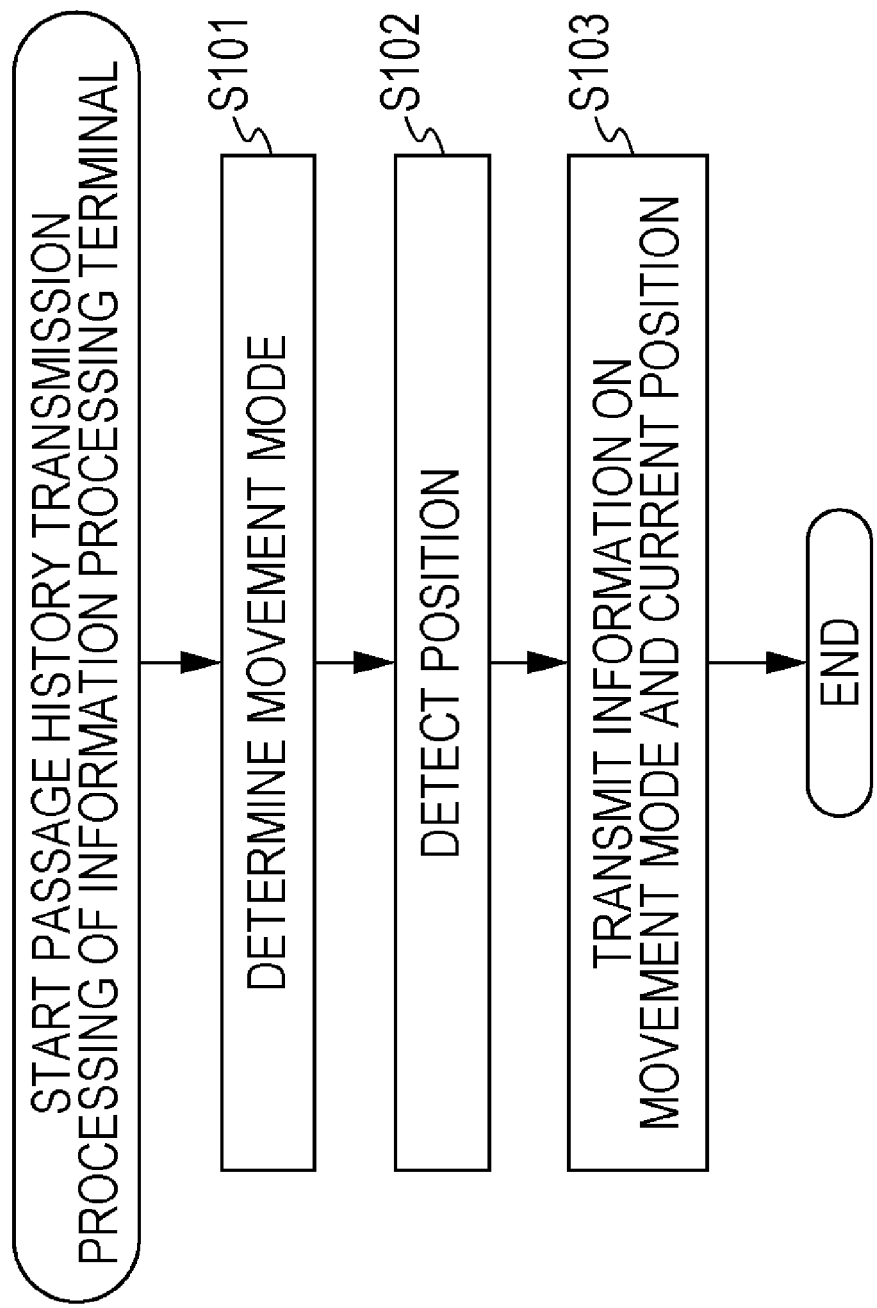
FIG. 18 is a flow chart for describing a passage history transmission processing of the information processing terminal.
Figure 19:
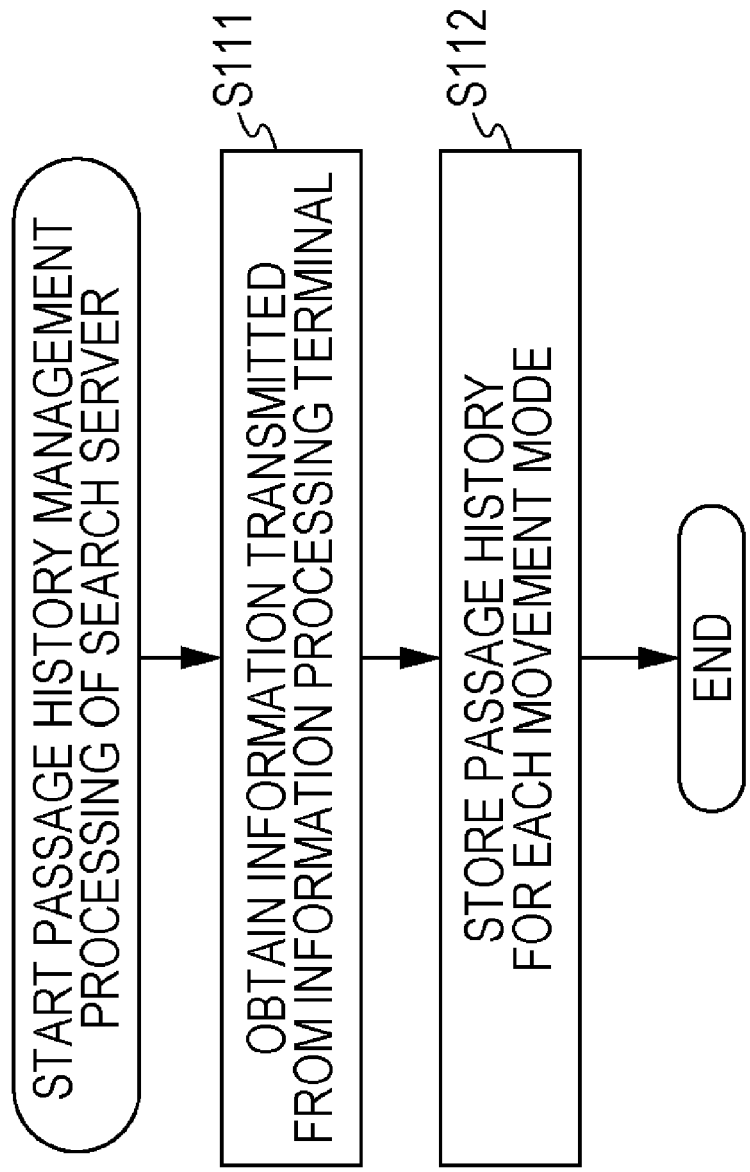
FIG. 19 is a flow chart for describing a passage history management processing of the search server.

While the processings in FIG. 18 and FIG. 19 are repeatedly carried out, the history storage unit 143 of the search server 101 respectively stores the passage history in a case where the movement mode is on foot, the passage history in the case of the car, and the passage history in the case of the bicycle.

Figure 20:
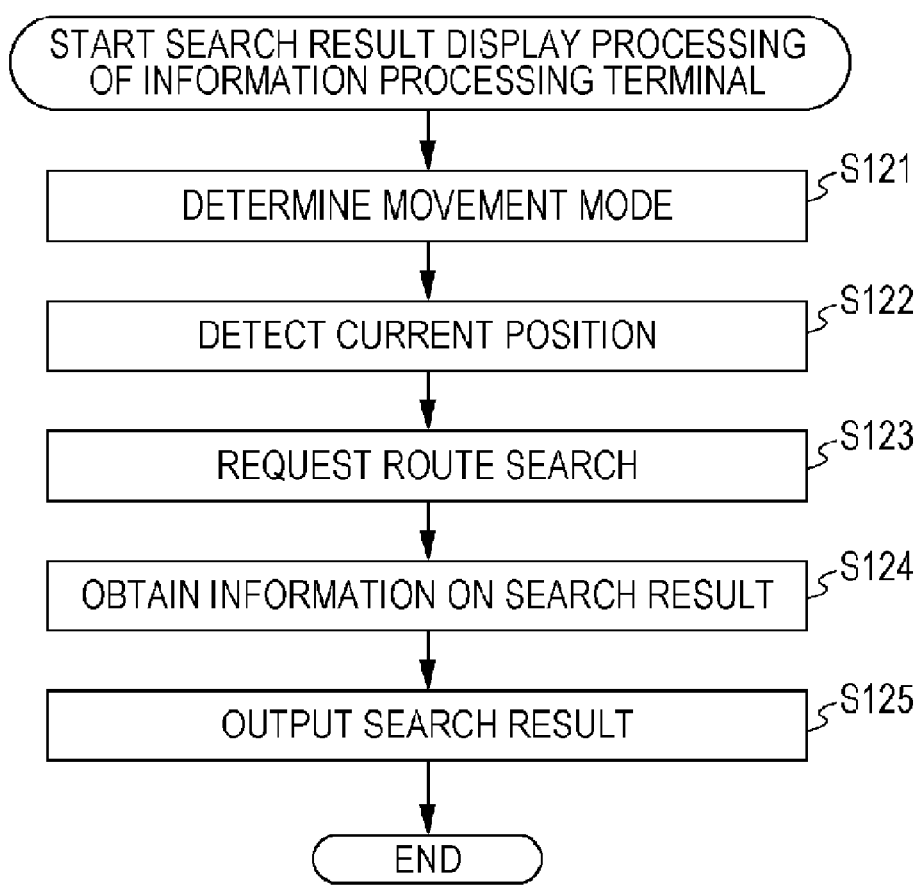
FIG. 20 is a flow chart for describing a search result display processing of the information processing terminal.

Next, with reference to a flow chart of FIG. 20, a processing of the information processing terminal 1 that displays the result of the route search will be described. The processing of FIG. 20 is started, for example, after the destination is set by the user and the setting on the route search is carried out.

In step S121, the movement mode detection unit 111 of the information processing terminal 1 determines the movement mode of the user on the basis of the information supplied from the attachment detachment detection unit 17.

In step S122, the position detection unit 14 performs the positioning to detect the current position.

In step S123, the obtaining unit 112 transmits the information on the movement mode of the user and the information on the current position together with the information on the destination, the information on the setting related to the search, and the like to the search server 101 and requests the route search. In the search server 101 receiving the request from the information processing terminal 1, a processing basically similar to the processing described with reference to FIG. 9 is carried out. When the route search is ended, the information including the route of the search result is transmitted from the search server 101.

In step S124, the search result obtaining unit 113 obtains the information transmitted from the search server 101.

In step S125, the search result obtaining unit 113 displays the map including the route of the search result on the display unit 2 to be presented to the user. Through the above-mentioned processing too, the user of the information processing terminal 1 can check the road where the passage frequency is low and can go to the destination with use of the road different from the usual road by moving while following the displayed route.

It should be noted that the determination on the movement mode of the user may also be carried out in the search server 101. A configuration of a part of the configuration illustrated in FIG. 17 can also be provided to the information processing terminal 1.

Modified Examples

In the above, the passage frequency of each road is calculated on the basis of the passage history, but the calculated passage frequency is reset at a predetermined timing, and the passage frequency may also be recalculated by using the passage history within a predetermined latest period of time.

According to this, with regard to the road where a certain period of time has elapsed since the passage, the passage frequency thereof can be decreased, and a route including the road where the user has not passed for a while can be more likely to be searched for.

Also, in the above, the movement mode of the user is determined on the basis of the attachment state of the cradle, but of course, the user may input the movement mode to the information processing terminal 1 by itself. The movement mode of the user may also be determined on the basis of the sensor data detected by the vibration sensor of the sensor unit 15.

In this case, in the information processing terminal 1, sensor data detected when moved on foot, sensor data detected when moved by car, and sensor data detected when moved by bicycle are prepared. While the matching between a characteristic of the previously prepared sensor data and a characteristic of the sensor data detected by the sensor unit 15 is carried out, the movement mode of the user is determined.

The route search taking the passage frequency into account is carried out in the information processing terminal 1 that is the PND or the search server 101, but the route search taking the passage frequency into account can be applied to various apparatuses. For example, it is possible to carry out the above-mentioned route search taking the passage frequency into account in a vehicle installment-use apparatus, a mobile phone device, a digital camera, and a personal computer having a navigation function.

Figure 21:
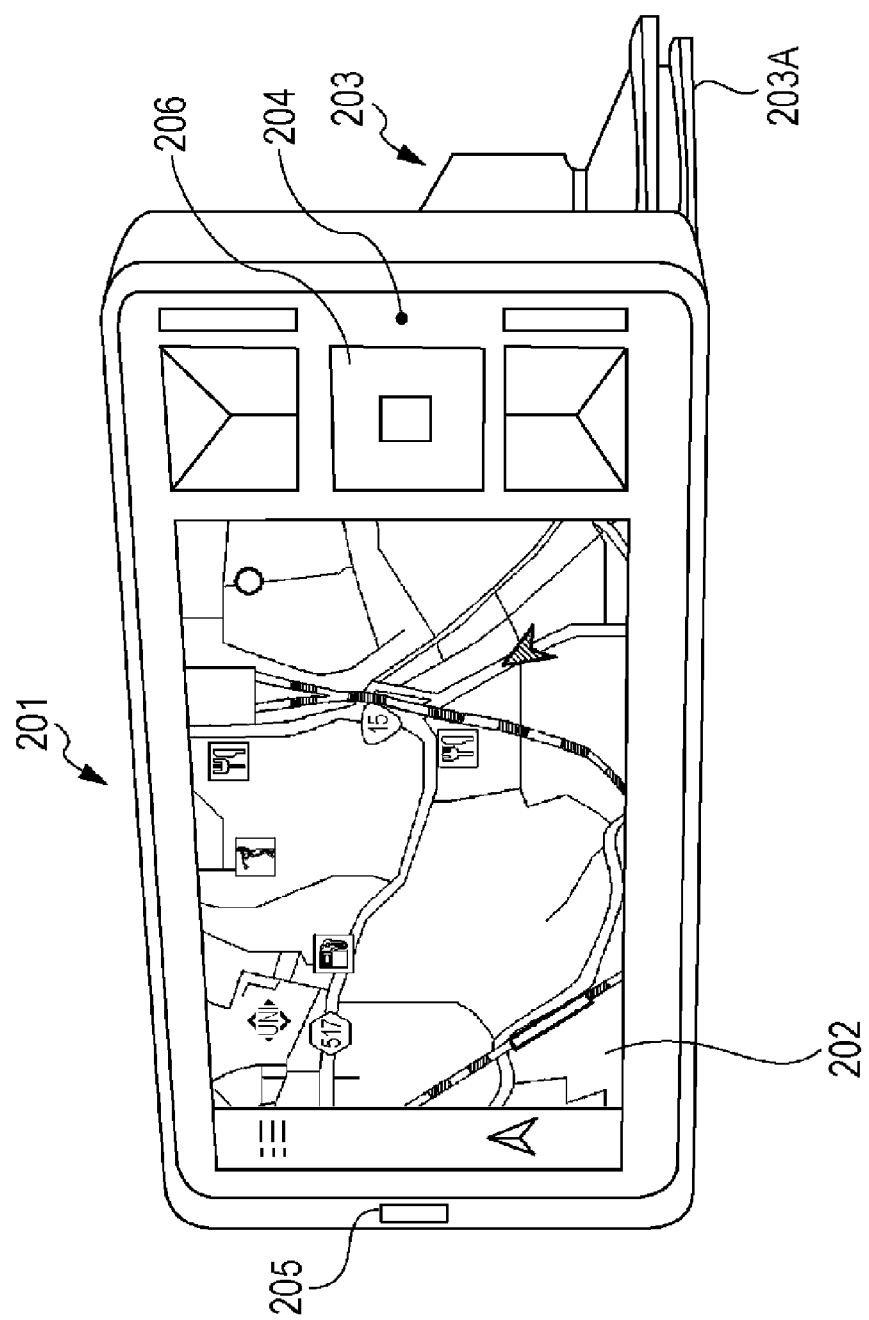
FIG. 21 illustrates a configuration example of an external appearance of a mobile phone device.

FIG. 21 illustrates an external appearance configuration example of the mobile phone device that performs the route search taking the passage frequency into account.

Similarly as in the information processing terminal 1, a mobile phone device 201 of FIG. 21 has a casing with a size at which the user can hold by one hand. A display unit 202 composed of an LCD or the like is provided on a front face of a casing of the mobile phone device 201.

The mobile phone device 201 has a GPS function and can perform the positioning of a position of its own terminal. The mobile phone device 201 displays the position of its own terminal on a map displayed on the display unit 202 and displays a route decided through the search on the map in a case where the destination is set and the search for the route to the destination is instructed.

In the vicinity of the display unit 202 on the casing front face of the mobile phone device 201, a speaker 205, a microphone 204, and an operation unit 206 composed of various buttons are provided. On a casing back face of the mobile phone device 201, a member for allowing the mobile phone device 201 to be fixed to a cradle 203 is provided.

Figure 22:
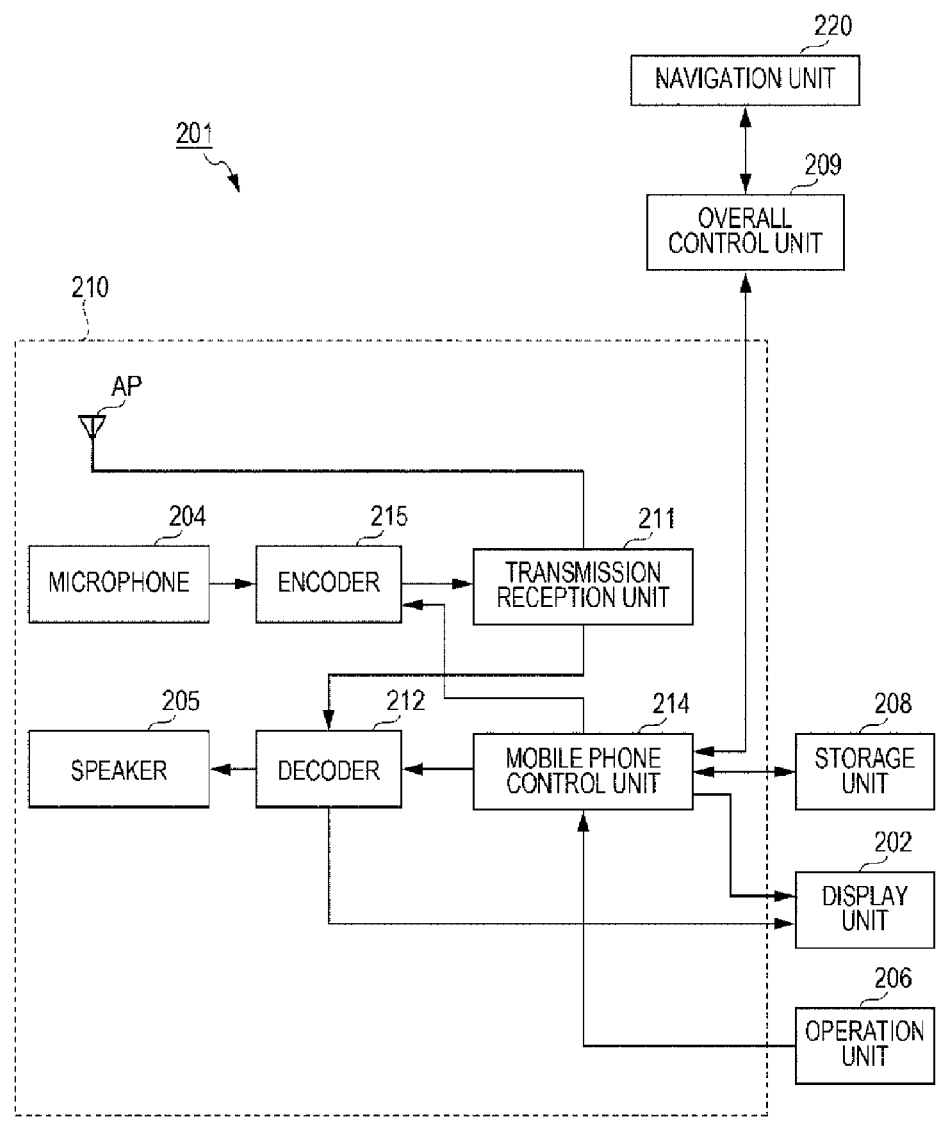
FIG. 22 is a block diagram illustrating a configuration example of the mobile phone device.

FIG. 22 is a block diagram illustrating a configuration example of the mobile phone device 201.

A mobile phone unit 210 of the mobile phone device 201 is composed of the microphone 204, the speaker 205, a transmission reception unit 211, a decoder 212, a mobile phone control unit 214, and an encoder 215.

At the time of a phone call, the microphone 204 collects voice of the user and outputs a voice signal to the encoder 215.

While following a control by the mobile phone control unit 214, the encoder 215 performs an encode on the voice signal supplied from the microphone 204 and outputs voice data obtained by the encode to the transmission reception unit 211.

The transmission reception unit 211 transmits the voice data supplied from the encoder 215 to an external base station from an antenna AP and causes a terminal of a call party to transmit. Also, when the voice data is transmitted from the terminal of the call party via the base station, the transmission reception unit 211 receives the voice data to be output to the decoder 212.

While following a control by the mobile phone control unit 214, the decoder 212 decodes the voice data and outputs the voice from the speaker 205.

The mobile phone control unit 214 detects the operation by the user with respect to the operation unit 206 and controls the overall operation of the mobile phone device 201. For example, the mobile phone control unit 214 controls the respective units of the mobile phone unit 210 to realize the call function and also displays the screen illustrated in FIG. 2 on the display unit 202 on the basis of information supplied from an overall control unit 209.

A storage unit 208 is composed of a flash memory and stores various pieces of information supplied from the mobile phone control unit 214.

The overall control unit 209 outputs information supplied from a navigation unit 220 to the mobile phone control unit 214 and conversely outputs information supplied from the mobile phone control unit 214 to the navigation unit 220. From the navigation unit 220, for example, the information on the screen representing the result of the route search is supplied to the overall control unit 209, and from the mobile phone control unit 214, the information representing the content of the operation by the user for performing the route search is supplied to the overall control unit 209.

The navigation unit 220 is composed of the computation processing unit 11, the position detection unit 14, the sensor unit 15, the attachment detachment detection unit, the storage unit 18 of FIG. 3, and the like. In the navigation unit 220, the respective configurations of FIG. 4 and FIG. 5 are realized, and the above-mentioned route search taking the passage frequency of the user into account is carried out.

In this manner, the route search taking the passage frequency of the user into account can be applied to various apparatuses.

The above-mentioned series of processings can be executed by hardware and can also be executed by software. In a case where the series of processings are executed by the software, a program constituting the software is installed into a computer incorporated in dedicated-use hardware, a general-use personal computer, or the like.

The installed program is recorded on the removable media 131 illustrated in FIG. 16 composed of an optical disc (a CD-ROM (Compact Disc-Read Only Memory), a DVD (Digital Versatile Disc), or the like), a semiconductor memory, or the like and presented. Also, it may be provided via a wired or wireless transmission medium such as a local area network, the internet, or digital satellite broadcasting. The programs can be previously installed into the ROM 122 or the storage unit 128.

It should be noted that the program executed by the computer may be a program in which the processings are performed in a time-series manner in the order described in the present specification or a program in which the processings are performed in parallel or at a needful timing such as a timing when a call is performed.

The embodiments of the present technology are not limited to the above-mentioned embodiments, and various changes can be made within a range without departing from the gist of the present technology.

For example, the present technology can adopt the following configurations.

(1)

An information processing terminal including:

a calculation unit that calculates a passage frequency of each road on the basis of a passage history; and a search unit that preferentially selects a road where the passage frequency is low and decides a route to a destination.

(2)

The information processing terminal according to the (1), further including:

a display unit that displays the route to the destination decided by the search unit on a map.

(3)

The information processing terminal according to the (1) or (2), further including:

an output unit that outputs the route to the destination decided by the search unit by way of voice.

(4)

The information processing terminal according to any one of the (1) to (3), further including:

a detection unit that detect a passed road; and a storage unit that stores information on the road detected by the detection unit as the passage history, in which the calculation unit calculates the passage frequency on the basis of the passage history stored in the storage unit.

(5)

The information processing terminal according to the (4), further including:

a movement mode detection unit that detects a movement mode of a user, in which the storage unit stores the passage history for each movement mode detected by the movement mode detection unit, and the calculation unit calculates the passage frequency on the basis of the passage history of a predetermined movement mode.

(6)

The information processing terminal according to any one of the (1) to (5), in which the search unit sets an area including a current position and the destination and does not select a route including a road out of the set area as the route to the destination.

(7)

The information processing terminal according to the (6), in which the search unit changes and sets the area in accordance with an amount of the passage history.

(8)

The information processing terminal according to any one of the (1) to (7), in which the calculation unit recalculates the passage frequency on the basis of the passage history within a predetermined recent period of time, and the search unit selects the route to the destination on the basis of the passage frequency recalculated by the calculation unit.

(9)

The information processing terminal according to any one of the (1) to (8), in which the search unit selects the route to the destination to pass a location specified by the user of the information processing terminal.

(10)

The information processing terminal according to any one of the (1) to (9), further including:

an obtaining unit that obtains, from a server on a network, text data posted to a Web site managed by the server and extracts information indicating a location from the text data, in which the search unit selects the route to the destination to pass the location indicated by the information extracted by the obtaining unit.

(11)

An information processing method including the steps of:

calculating a passage frequency of each road on the basis of a passage history; and preferentially selecting a road where the passage frequency is low and deciding a route to a destination.

(12)

A program for causing a computer to execute a processing including the steps of:

calculating a passage frequency of each road on the basis of a passage history; and preferentially selecting a road where the passage frequency is low and deciding a route to a destination.

REFERENCE SIGNS LIST

1 INFORMATION PROCESSING TERMINAL
2 DISPLAY UNIT
11 COMPUTATION PROCESSING UNIT
14 POSITION DETECTION UNIT
17 ATTACHMENT DETACHMENT DETECTION UNIT
52 INFORMATION PROCESSING UNIT
71 MOVEMENT MODE DETECTION UNIT
72 HISTORY MANAGEMENT UNIT
73 HISTORY STORAGE UNIT
74 PASSAGE FREQUENCY CALCULATION UNIT
75 REGISTRATION INFORMATION/ATTENTION INFORMATION OBTAINING UNIT
76 SEARCH-USE INFORMATION STORAGE UNIT
77 SEARCH UNIT
78 MAP DATA STORAGE UNIT
79 DISPLAY CONTROL UNIT

The invention claimed is:

1. An information processing apparatus, comprising:
   circuitry configured to:
   determine a movement mode of the information processing apparatus;
   retrieve width information related to a passage from a memory;
   retrieve a number of passage times based on passage history information in accordance with the determined movement mode; and
   search a navigation route based on the number of passage times and the width information.

2. The information processing apparatus according to claim 1, wherein the circuitry is further configured to calculate a number of passages based on movement condition of the information processing apparatus.

3. The information processing apparatus according to claim 1, wherein the circuitry is further configured to register a place based on user input, and create icon information to display an icon at the place on a map.

4. The information processing apparatus according to claim 3, wherein the icon information comprises information that corresponds to the place.

5. The information processing apparatus according to claim 1, wherein the circuitry is further configured to register a place based on online information.

6. The information processing apparatus according to claim 1, wherein the circuitry is further configured to display information that corresponds to the navigation route on a map, and change the displayed information based on a number of passages.

7. The information processing apparatus according to claim 1, wherein the circuitry is further configured to set an area on a map, and to search the navigation route based on the set area on the map.

8. The information processing apparatus according to claim 7, wherein the set area is an exception area, and wherein the circuitry is further configured to search the navigation route outside of the set area.

9. The information processing apparatus according to claim 1, wherein the circuitry is further configured to search the navigation route based on condition information of each position on a map.

10. The information processing apparatus according to claim 9, wherein the condition information includes at least one of a length, a width, a type, a structure, or a gradient of each position on the map.

11. The information processing apparatus according to claim 1, wherein the circuitry is further configured to determine the movement mode based on a state of attachment of the information processing apparatus with respect to a cradle.

12. The information processing apparatus according to claim 11, wherein the circuitry is further configured to determine the state of attachment as an attached state where the information processing apparatus is attached to the cradle, or as a detached state where the information processing apparatus is detached from the cradle.

13. The information processing apparatus according to claim 1, wherein the number of passage times corresponds to a passage frequency of the passage.

14. An information processing method, comprising:
   in an information processing apparatus:
   determining a movement mode of the information processing apparatus;
   retrieving width information related to a passage from a memory;
   retrieving a number of passage times based on passage history information in accordance with the determined movement mode; and
   searching a navigation route based on the number of passage times and the width information.

15. A non-transitory computer-readable storage medium having computer-executable instructions stored thereon, which when executed by a computer cause the computer to perform operations, comprising:
   determining a movement mode of an information processing apparatus;
   retrieving width information related to a passage from a memory;
   retrieving a number of passage times based on passage history information in accordance with the determined movement mode; and
   searching a navigation route based on the number of passage times and the width information.

* * * * *